United States Patent
Okamoto et al.

(10) Patent No.: US 8,143,343 B2
(45) Date of Patent: Mar. 27, 2012

(54) MICROPHASE-SEPARATED STRUCTURE, IMMOBILIZED MICROPHASE-SEPARATED STRUCTURE AND WAVELENGTH-VARIABLE LASER OSCILLATOR, TEMPERATURE SENSOR AND LIGHT FILTER USING THE STRUCTURE

(75) Inventors: Shigeru Okamoto, Nagoya (JP); Katsuhiro Yamamoto, Nagoya (JP); Tatsuhiro Iwama, Nagoya (JP); Mayu Okada, Nagoya (JP); Shigeo Hara, Hamamatsu (JP); Yoshihiro Takiguchi, Hamamatsu (JP); Masahiro Mouri, Tokyo (JP); Katsushi Watanabe, Tokyo (JP)

(73) Assignees: Nagoya Institute of Technology, Aichi (JP); Japan Aerospace Exploration Agency, Tokyo (JP); Hamamatsu Photonics K.K., Shizuoka (JP); Asahi Kasei EMD Corporation, Tokyo (JP)

( * ) Notice: Subject to any disclaimer, the term of this patent is extended or adjusted under 35 U.S.C. 154(b) by 0 days.

(21) Appl. No.: 12/311,915

(22) PCT Filed: Aug. 30, 2007

(86) PCT No.: PCT/JP2007/066939
§ 371 (c)(1),
(2), (4) Date: Dec. 18, 2009

(87) PCT Pub. No.: WO2008/047514
PCT Pub. Date: Apr. 24, 2008

(65) Prior Publication Data
US 2010/0103414 A1  Apr. 29, 2010

(30) Foreign Application Priority Data
Oct. 20, 2006 (JP) ................ 2006-286085
Oct. 20, 2006 (JP) ................ 2006-286089

(51) Int. Cl.
*B60C 1/00* (2006.01)
*C08G 63/91* (2006.01)

(52) U.S. Cl. .................... 524/526; 525/50
(58) Field of Classification Search .............. 524/526
See application file for complete search history.

(56) References Cited

U.S. PATENT DOCUMENTS
6,002,522 A 12/1999 Todori et al.
7,432,037 B2 * 10/2008 Suzuki et al. ............ 430/286.1

FOREIGN PATENT DOCUMENTS
| JP | 10-83005 | 3/1998 |
| JP | 3507659 | 12/2003 |
| JP | 2004-99667 | 4/2004 |
| JP | 2005-60583 | 3/2005 |
| JP | 2005060583 A * | 3/2005 |
| JP | 2005-112934 | 4/2005 |
| JP | 2006-287024 | 10/2006 |

OTHER PUBLICATIONS

Ise et al., "New Polymer Chemistry Introduction", Kagaku-dojin Publishing Company, Inc, pp. 90-91, (1995).
Rockford et al., "Polymers on Nanoperiodic Heterogeneous Surfaces", Physical Review Letters, vol. 82, No. 12, pp. 2602-2605, (1999).
Kim et al., "Epitaxial Self-Assembly of Block Copolymers on Lithographically Defined Nanopatterned Substrates", Nature, vol. 424, pp. 411-414, (2003).
Register, "On the Straight and Narrow", Nature, vol. 424, pp. 378-379, (2003).
Shibayama et al.; "Ordered Structure in Block Polymer Solutions, 1. Selective Solvents," Macromolecules, vol. 16, No. 1, pp. 16-28, (1983).
Bockstaller et al., "Optical Properties of Polymer-Based Photonic Nanocomposite Materials", J. Phys. Chem,, B. vol. 107, No. 37, pp. 11017-10024, (2003).
Deng et al., "Two-Dimensional Block Copolymer Photonic Crystals", Polymer, vol. 44, pp. 6549-6553, (2003).
International Preliminary Report on Patentability (PCT/JP2007/066939) dated Apr. 30, 2009.

* cited by examiner

*Primary Examiner* — Ling Choi
*Assistant Examiner* — Hui Chin
(74) *Attorney, Agent, or Firm* — Finnegan, Henderson, Farabow, Garrett & Dunner, L.L.P.

(57) ABSTRACT

A microphase-separated structure comprising a block copolymer, which contains at least a block chain A consisting of a monomer A as a repeating unit and a block chain B consisting of a monomer B as a repeating unit, and a solvent, wherein the solvent has a temperature zone 1 where the block chain A and the block chain B are soluble and a temperature zone 2 where the block chain A is insoluble but the block chain B is soluble, and a structural period thereof varies by changing temperature between the temperature zone 1 and the temperature zone 2.

7 Claims, 19 Drawing Sheets

1: Microphase-separated structure containing a laser dye
2: Excitation light source
3: Excitation light
4: Heating/cooling element
5: Laser light 1 : Microphase-separated structure containing a laser dye
2 : Excitation light source
3 : Excitation light
5 : Pipe
6 : Laser light
7 : Optical fiber
8 : Spectroscopic detector 9 : Cell containing a microphase-separated structure
4 : Heating/cooling element
10 : Monochromatic light source
11 : Monochromatic light

MICROPHASE-SEPARATED STRUCTURE, IMMOBILIZED MICROPHASE-SEPARATED STRUCTURE AND WAVELENGTH-VARIABLE LASER OSCILLATOR, TEMPERATURE SENSOR AND LIGHT FILTER USING THE STRUCTURE

TECHNICAL FIELD

The present invention relates to a microphase-separated structure comprising a high-molecular weight block copolymer, which is formed by using a self-assembling ability of a block copolymer in place of using nanofabrication technology, and which is capable of controlling temperature dependence of a structural period, and an immobilized microphase-separated structure formed by a photopolymerization method, and further relates to optical devices using the temperature characteristics of the structure such as a wavelength-variable laser oscillator, a temperature sensor and a light filter.

BACKGROUND ART

The block copolymer refers to a polymer consisting of a chain where monomers A are repeatedly connected and a chain where monomers B are repeatedly connected, as described in Non-Patent Document 1, p. 90 and 91. A chain consisting of the monomers A or the monomers B is called a block chain. Furthermore, a diblock copolymer formed of a single block chain A and a single block chain B is expressed by A-b-B. In the present invention, a block chain having a slightly branched portion may not be excluded.

The block copolymer forms an ordered microdomain structure, when constituent blocks are immiscible and hence separated into phases. Such an aggregate is called a microphase-separated structure.

The microdomain structure shows various types of morphology depending upon the composition of the block copolymer. The morphologies are classified into, for example, a lamellar structure in which two block chains are alternately layered; a cylindrical structure in which one of the block chains form cylinders in the matrix formed of the other block chain; a spherical in which one of the block chains form spheres in the matrix formed of the other block chain; and a network structure called a gyroid structure.

However, these microdomains cannot be enlarged beyond the stretch of block chain components thereof. Usually an orderly oriented texture structure (hereinafter, referred to as a "grain") is formed only within a narrow range of a sub-micron size. Also, when a plurality of grains are aggregated, a microphase-separated structure non-orderly oriented is formed. Namely, the microphase-separated structure has macroscopically a random orientation and forms an isotropic structure as a whole. Therefore, it is difficult to effectively use it as a functional material based on the characteristic of a microphase-separated structure orderly oriented. This is a problem.

To solve this problem, Non-Patent Document 2 discloses a structure having a uniform orientation in the in-plane direction. This is formed, for the first time, by purposely placing a layer on the surface of which a pattern is formed in advance, under a block copolymer.

However, to form a pattern in the surface of the underling layer, it is necessary to use nanofabrication techniques such as photolithography or use of a probe tip of a scanning probe microscope. Therefore, as the size of pattern is reduced more and more, a more complicated step must be performed for a long time by use of expensive equipment. Besides this, the material of a substrate to be processed and the shape and area thereof are also limited. In addition, the formed microphase-separated structure does not have temperature response at all.

Furthermore, Patent Document 1 discloses a lamellar structure, which is formed by placing a block copolymer on a substrate having a predetermined surface roughness and annealing it. Also Non-Patent Documents 3 and 4 disclose a lamellar structure, which is formed while orientation is controlled by epitaxial growth.

However, in the method disclosed in Patent Document 1, the substrate must be processed in advance and an annealing step is required. In this respect, this method is far from a convenient method. Even if the method disclosed in Non-Patent Document 2 is used, it is estimated that a visible-size single crystalline giant grain is not easily formed. In addition, no discussion is made on the temperature dependence of the obtained lamellar structure.

On the other hand, with respect to the structural color due to Bragg reflection depending upon periodical microphase-separated structure of a high-molecular weight block copolymer, only a few studies are known which are made in an equilibrium system using a good solvent, as disclosed in Non-Patent Document 5. However, with respect to temperature dependence, it has only been generally reported that the wavelength of a structural color gradually changes (power law of $-\frac{1}{3}$ power) depending upon temperature.

Also, with respect to a method of immobilizing a microphase-separated structure, Non-Patent Documents 6 and 7 disclose a method of forming a thin film by evaporation of a solvent. However, since distortion occurs by evaporation of a solvent during a film formation process, nothing is obtained other than a distorted microphase-separated structure.

A case where a microphase-separated structure of a block copolymer is used as a laser resonator is described in Patent Document 2. The microphase-separated structure to be used as a laser resonator is formed by the solution cast method. However, no discussion was made on a temperature dependence of period of a microphase-separated structure, that is, cavity length determining oscillation wavelength.

A case where a colloid crystal is used as a photonic crystal serving as a laser resonator is described in Patent Document 3 in the same as in the previous paragraph. However, the photonic crystal using a colloid crystal is used only as an output reflecting mirror and a luminescent layer is separately provided. Therefore, different from the structure of the present invention where a luminescent layer containing laser medium is embedded into a laser resonator, that is, laser medium is uniformly introduced into microphase-separated structure (the resonator), optical parallelism of the luminescent layer and the output reflecting mirror must be controlled. In addition, similarly to Patent Document 2, no discussion is made on temperature dependence as a characteristic of a resonator. A mention is only made of an advantage, that is, high thermal stability.

Patent Document 1: Japanese Patent Application Laid-Open No. 2004-99667
Patent Document 2: Japanese Patent No. 3507659
Patent Document 3: Japanese Patent Application Laid-Open No. 2006-287024
Non-Patent Document 1: Norio Ise et al., "New Polymer Chemistry Introduction" Kagaku-dojin Publishing Company, Inc, 1995
Non-Patent Document 2: L. Rockford et al. Physical Review Letters 82, 2602 (1999)
Non-Patent Document 3: Sang Ouk Kim et al., Nature, Vol. 424, p. 411 to 414 (2003)

Non-Patent Document 4: Richard A. Register et al., Nature, Vol. 424, p. 378 to 379 (2003)

Non-Patent Document 5: Mitsuhiro Shibayama et al., Macromolecules, 16, p. 16 to 28 (1983)

Non-Patent Document 6: Michael R, Bockstaller et al., J. Phys. Chem. B, vol. 107, No. 37, p. 10017 to 10024 (2003)

Non-Patent Document 7: Tao Deng et al., Polymer, No. 44, p. 6549 to 6553 (2003)

DISCLOSURE OF THE INVENTION

Problems to be Solved by the Invention

As described in the aforementioned examples, only the period of microphase-separated structure exhibiting a gradual temperature response has been known.

However, the microphase-separated structure of the present invention has a grain having a microphase-separated structure containing a specified solvent and showing a structural color. Temperature dependence of the period of the microphase-separated structure can be controlled by changing temperature. In the present invention, the proximity of θ temperature is selected as a temperature range within which the temperature of a solution is changed. By virtue of this, the microphase-separated structure of the present invention can be used as a microphase-separated structure whose structural period is widely changed, that is, a material whose photonic band gap is widely changed depending upon temperature. For example, the structure is useful as a resonator for a wavelength-variable laser and a sensor, and a material such as a light filter and an optical switch.

Furthermore, according to the present invention, it is possible to easily prepare an immobilized microphase-separated structure by immobilizing a giant grain in gel form without disturbing structural order and to use the structure in a wide variety of electronic devices and optical devices having a stable structure.

Furthermore, it is possible to provide a photonic crystal available in electronic devices and optical devices, in particular, to provide a tunable photonic crystal material.

Means for Solving the Problems

The present invention discloses (1) a microphase-separated structure, which is formed by use of self-assembly of block copolymers having a high molecular weight in place of using high-precision processing technology such as nano-fabrication technology including photolithography as well as a complicated processing step. At this time, a specified solvent is used, thereby forming a visible-size single-crystal-like giant grain, that is, a microphase-separated structure aggregate. Furthermore, the temperature of the solution is changed within a specified range, thereby changing segregation power by the solvent, or driving force for microphase separation. As a result, the structural period of the microphase-separated structure changes. Also, the present invention discloses (2) an immobilized microphase-separated structure formed by a method of immobilizing the obtained microphase-separated structure by a photopolymerization method without disturbing structural order. Furthermore, the present invention discloses (3) an optical device using the temperature characteristic of the microphase-separated structure.

First of all, (1) the microphase-separated structure whose structural period varies by changing temperature will be described.

The present inventors found that a single-crystal-like giant grain can be easily obtained in a self-assembly manner by selecting a solvent whose solubility varies by changing temperature, and further found that the structural period of the microphase-separated structure can be controlled by changing temperature.

More specifically, according to a first aspect of the present invention, there is provided a microphase-separated structure including a block copolymer, which contains at least a block chain A consisting of a monomer A as a repeating unit and a block chain B consisting of a monomer B as a repeating unit, and a solvent, wherein the solvent has a temperature zone 1 where the block chain A and the block chain B are soluble and a temperature zone 2 where the block chain A is insoluble but the block chain B is soluble, and the structural period thereof varies by changing temperature between the temperature zone 1 and the temperature zone 2. In particular, it is preferred that the solvent is a solvent mixture of a good solvent for both the block chain A and the block chain B and a poor solvent for at least one of the block chains.

It is more preferred that the concentration of the block copolymer relative to the solution and temperature thereof are within the ranges where a structural color is shown.

Particularly, it is most preferred that the microphase-separated structure has a visible-size grain and that the border temperature between the temperature zone 1 and the temperature zone 2 in the proximity of θ temperature. Note that θ temperature is defined as the temperature where a second virial coefficient becomes 0 as described in Non-Patent Document 1, P108 and 109.

According to a second aspect of the present invention, there is provided an immobilized microphase-separated structure formed by further adding a photopolymerization initiator to the microphase-separated structure according to the first aspect and irradiating an actinic rays thereto.

Particularly, in the immobilized microphase-separated structure, it is preferred that the microphase-separated structure before irradiation with the actinic rays has visible-size grains and it is further preferred that one of the block chain A and the block chain B of the block copolymer has a double bond of diene.

According to a third aspect of the present invention, there is provided a wavelength-variable laser oscillator constituted of the microphase-separated structure according to the first aspect of the present invention, which contains a luminous body such as a fluorescent dye compound, luminescent particles as a laser medium, a heating/cooling element and an excitation source, wherein the temperature of the heating/cooling element can be arbitrarily controlled temporally or spatially by an exterior power source or signal source and the excitation source is an excitation light source which optically excites the luminous body to emit light or a driving power source which electronically excites the luminous body to emit light.

Particularly, it is preferred that a wavelength-variable laser oscillator is constituted of the microphase-separated structure according to the first aspect of the present invention containing a laser dye, a heating/cooling element and an excitation source, wherein the temperature of the heating/cooling element can be arbitrarily controlled temporally or spatially by an exterior power source or signal source, and the excitation source is an excitation light source which optically excites the laser dye to cause oscillation or a driving power source which electronically excites the laser dye to cause oscillation.

According to a fourth aspect of the present invention, there is provided a temperature sensor capable of measuring the peripheral temperature of the microphase-separated structure according to the first aspect of the present invention, which is constituted of a laser resonator using the microphase-separated structure according to the first aspect of the present invention containing a laser medium, an excitation source and a spectroscopic measurement unit, wherein the excitation source is an excitation light source which optically excites the laser medium to cause oscillation or a driving power source which electronically excites the laser medium to cause oscillation and the spectroscopic measurement unit guides the oscillated laser light to the site at which the laser light is required and the wavelength thereof is spectroscopically analyzed.

According to a fifth aspect of the present invention, there is provided a light filter constituted of a transparent cell equipped with a heating/cooling element and containing the microphase-separated structure according to the first aspect of the present invention therein, a monochromatic light source, a spectroscopic detector and an analyzer, wherein the heating/cooling element can be arbitrarily controlled temporally or spatially by an exterior power source or signal source; the light source is constituted of at least two types of monochromatic light beams; the spectroscopic detector can separately detect the wavelengths of light beams passed through the cell; and the analyzer outputs the signal from the spectroscopic detector as an exterior signal.

ADVANTAGES OF THE INVENTION

The microphase-separated structure of the present invention has a grain of the microphase-separated structure showing a structural color and the temperature dependence of the structural period of microphase-separated structure can be controlled by changing temperature.

In the present invention, the proximity of θ temperature is selected as the temperature range within which the temperature of a solution is changed. By virtue of this, the microphase-separated structure of the present invention can be used as a microphase-separated structure whose structural period is widely changed, that is, a material whose photonic band gap is widely changed depending upon temperature. For example, the structure is useful as a resonator for wavelength-variable laser and a sensor, and a material such as a light filter and an optical switch.

Furthermore, according to the present invention, it is possible to easily prepare an immobilized microphase-separated structure in which a giant grain is immobilized in gel-form without disturbing the structural order and to use the structure for a wide variety of electronic devices and optical devices having a stable structure.

Furthermore, it is possible to provide a photonic crystal available for electronic devices and optical devices, in particular, to provide a tunable photonic crystal material.

BEST MODE FOR CARRYING OUT THE INVENTION

The present invention will be more specifically described below.

First, with respect to (1) the microphase-separated structure among the items according to the present invention, two preferable embodiments of the microphase-separated structure, different in characteristics will be provided.

Embodiment 1 is directed to a microphase-separated structure comprising a block copolymer containing at least a block chain A consisting of a monomer A as a repeating unit and a block chain B consisting of a monomer B as a repeating unit, and a solvent, wherein the solvent has a temperature zone 1 where the block chain A and the block chain B are soluble and a temperature zone 2 where the block chain A is insoluble but the block chain B is soluble and the structural period thereof varies by changing the temperature between the temperature zone 1 and the temperature zone 2.

Note that a solvent having the temperature zone 1 dissolving a certain polymer and the temperature zone 2 not dissolving the certain polymer is called a selective solvent as disclosed in Non-Patent Document 5. In the microphase-separated structure, it is preferred that the concentration of the polymer in the solution and the temperature of the solution are within the ranges where a structural color is shown because the microphase-separated structure is easily applied to a photonic crystal material available for electronic devices and optical devices.

Embodiment 2 is directed to a microphase-separated structure constituted of a block copolymer containing at least a block chain A and a block chain B and a solvent, wherein the solvent is a solvent mixture of a solvent serving as a good solvent for both the block chain A and the block chain B and a solvent serving as a poor solvent for at least one of the block chains. A good solvent is a solvent which dissolves a polymer chain, whereas a poor solvent is a solvent which does not dissolve a polymer chain.

In the microphase-separated structure, it is preferred that the concentration of a polymer in the solution, the concentration of the poor solvent in the solvent mixture and the temperature of the solution are within the ranges where a structural color is shown because the microphase-separated structure is easily applied to a photonic crystal material available for electronic devices and optical devices and because the microphase-separated structure is not easily disturbed when it is immobilized.

The microphase-separated structure to be used in the control method of the present invention varies depending upon the types of polymer chains constituting the block copolymer and the combination thereof, a volume fraction thereof and the type of solvent for dissolving the block copolymer. Polymers that are generally used, for example, polystyrene, poly-p-chlorostyrene, polymethylmethacrylate, polyacrylic acid, polyisoprene, polybutadiene, polyacrylonitrile, polyvinyl chloride and polyvinyl acetate may be used in an appropriate combination in accordance with the structure to be desired. In accordance with the combination, a selective solvent, a good solvent and a poor solvent such as toluene, tetrahydrofuran (hereinafter sometimes referred to as "THF"), cyclohexane, n-hexane, acetone, chloroform and water are appropriately selected.

In the present invention, it is technically important to use a selective solvent alone or a solvent mixture of a good solvent and a poor solvent in generating a giant grain and obtaining temperature dependence of the structural period of the microphase-separated structure. Its action principle resides in increasing segregation power which is driving force for the microphase separation, by use of the function of a solvent, thereby facilitating self-assembly of the block copolymer.

Next, the principle will be explained.

For example, in the case of a block copolymer constituted of polybutadiene and polystyrene, cyclohexane may be mentioned as a selective solvent for a high-molecular weight polystyrene block chain. Cyclohexane works as a solvent not dissolving one of the block chains of the block copolymer at room temperature or less. Cyclohexane herein dissolves a polybutadiene block polymer in all temperature zones.

In another case, a THF solution containing a small amount of water may be used as a solvent for a polystyrene-polymethylmethacrylate block copolymer. In this case, THF serves as a good solvent for both the polystyrene block chain and the polymethylmethacrylate block chain. Water serves as a poor solvent for both of them. The THF/water solvent mixture dissolves both block chains in a high temperature zone 1; whereas does not dissolve polystyrene in a temperature zone 2 lower than the temperature zone 1. However, in the higher temperature zone of the temperature zone 2, polymethylmethacrylate can be dissolved.

In both cases above, as the temperature is decreased, solubility decreases. However, the present invention does not exclude the case where solubility decreases by increasing the temperature.

The solubility of the block chains constituting a block copolymer can be evaluated by dissolving a polymer consisting of single repeat units, that is, a homopolymer, in the solvent and measuring the turbidity of the solvent while increasing the temperature of the solvent.

The block copolymer to be used in the present invention desirably has a relatively high molecular weight. The weight average molecular weight determined by gel permeation chromatography (GPC) using polystyrene standard is desirably $1.0 \times 10^5$ to $40 \times 10^5$ g/mol, and more preferably $5.0 \times 10^5$ to $20 \times 10^5$ g/mol. When the molecular weight is less than $1.0 \times 10^5$ g/mol, the interlayer distance of a lamellar structure is too short or interlayer distances may have wide distribution. As a result, a grain having an highly ordered structure itself may not be obtained. When the molecular weight is larger than $40 \times 10^5$ g/mol, it is difficult to obtain a block copolymer itself by polymerization. Therefore, this case is not preferable.

It is preferred that the block copolymer to be used in the present invention is used in the state of a relatively dilute solution showing a structural color. The amount of the block copolymer is preferably 1.0 to 15% by mass relative to the total amount of solvent, more preferably 3.0 to 10% by mass. When the amount is less than 1.0% by mass, the viscosity of the solution is low. As a result, the mobility of the block copolymer increases and a grain itself cannot be formed and the microphase-separated structure is distorted. Therefore, this case is not preferable. When the concentration is larger than 15% by mass, the viscosity of the solution is too high. As a result, the mobility of the block copolymer decreases. The size of a grain becomes extremely small and the temperature dependence of a block copolymer solution is not obtained. Therefore, this case is not preferable.

The poor solvent of the solvent mixture used in Embodiment 2 of the present invention is preferably contained in an amount of 1.0 to 20% by mass relative to the total amount of solvent, and more preferably 3.0 to 15% by mass. When the amount of the poor solvent is less than 1.0% by mass, the segregation power of the solvent is not applied and self assembly of the microphase-separated structure is not facilitated. When the amount of the poor solvent is larger than 20% by mass, the solubility of the block copolymer in the solvent decreases and the block polymer is likely to precipitate. As a result, the size of a grain becomes extremely small. Therefore, this case is not preferable.

As a method of changing the temperature of the microphase-separated structure having a giant grain in the present invention, it is desirable that a solution thereof is once allowed to stand still while keeping it at a constant temperature and thereafter the temperature of the solution is gently and uniformly changed within the temperature range where the structural color is shown. It is effective to allow the solution once to stand still because the microphase-separated structure becomes not easily to break. It is also effective to uniformly change the temperature because the microphase-separated structure is suppressed from being partially disturbed and uniform change of the structural period can be facilitated.

The change of the structural period of the microphase-separated structure with temperature is determined by solubility of polymer components of the block copolymer in a solvent, that is, the interaction between the polymer components and the solvent. More specifically, the change is conceivably due to a change of solubility of the block copolymer in a solvent caused by a temperature change.

Next, (2) a method of immobilizing a visible-size single-crystal-like giant grain formed by the method above, more specifically, a method of immobilizing orderly-oriented microphase-separated structure's aggregate in a convenient method without disturbing the structural order of the microphase-separated structure and the immobilized structure will be more specifically described.

The immobilized microphase-separated structure of the present invention is formed by irradiating an actinic rays to the microphase-separated structure including a block polymer, which contains at least a block chain A consisting of a monomer A as a repeating unit and a block chain B consisting of a monomer B as a repeating unit, a photopolymerization initiator and a solvent, wherein the solvent has a temperature zone 1 where the block chain A and the block chain B are soluble and a temperature zone 2 where the block chain A is insoluble but the block chain B is soluble, and a structural period thereof varies by changing the temperature between the temperature zone 1 and the temperature zone 2.

As the actinic rays used herein are preferably ultraviolet rays (hereinafter referred to also as "UV").

Generally, the polymerization initiator that can be activated by irradiation of an actinic rays mostly refers to a radical type photopolymerization initiator. When the radical type photopolymerization initiator is irradiated with light, the molecule is cleaved into radicals, which cause a radical polymerization reaction of a photopolymerizable polymer or monomer. As a result, the material is changed into a high-molecular weight material by crosslinking to facilitate gelation. Examples of the photopolymerization initiator include IRGACURE 651 (benzyl dimethyl ketal manufactured by Ciba Speciality Chemicals), IRGACURE 184 (α-hydroxyalkyl phenone manufactured by Ciba Speciality Chemicals) and IRGACURE 907 (α-aminoalkyl phenone manufactured by Ciba Speciality Chemicals), which have a structure where a carbonyl group is directly bonded to a benzene ring. When actinic rays are irradiated, α-cleavage occurs at the carbonyl carbon to produce active radicals, which are involved in a polymerization reaction of a polymerizable polymer and monomer.

These photopolymerization initiators may be used alone or as a mixture of two or more types.

The photopolymerization initiators to be used in the present invention vary in polymerization reactivity and dispersibility in a solvent depending upon the types of block chains constituting a block copolymer, the combination of the block chains and the type of solvent dissolving the block copolymer. Therefore, the types and amounts of photopolymerization initiators are appropriately selected depending upon the block copolymer solution.

As the block copolymer having a good compatibility with the photopolymerization initiator to be used in the present invention, it is preferred to employ a block copolymer having a double bond of diene in one of the polymer chains, and particularly, having a polybutadiene structure in one of the polymer chains. As the photopolymerization initiator to be used herein, an alkylphenone type photopolymerization initiator having a carbonyl group directly bonded to a benzene ring as mentioned above is preferred, and particularly benzyl dimethyl ketal (IRGACURE 651) is preferred.

The amount of the photopolymerization initiator to be used in the present invention is preferably in the ranges from 0.2% by mass to 20% by mass (both inclusive) relative to the amount of a block copolymer, and further preferably from 0.5% by mass to 10% by mass (both inclusive). When the amount of the photopolymerization initiator is less than 0.2% by mass, it is difficult to perform gelation efficiently. As a result, a gel-like immobilized structure cannot be obtained. On the other hand, when the amount of the photopolymerization initiator is larger than 20% by mass, the photopolymerization initiator is likely to be non-uniformly dispersed in a solvent. In addition, the microphase-separated structure is easily distorted, with the result that a grain may not be produced in some cases. Besides this, when a thick crosslinked product is to be produced, the material absorbs light by itself and may prevent photocuring of the whole part.

In the present invention, the microphase-separated structure before an actinic rays are applied, in other words, before gelation and immobilization, desirably has a visible size and a single-crystal-like structure. This is technically important to produce an immobilized microphase-separated structure having structural order without any distortion through gelation. The size of the microphase-separated structure is at least visible, and preferably 30 μm or more at which a structural color is shown in a block copolymer solution, more preferably 300 μm or more, and most preferably 3 mm or more. When the size is too small to show a structural color in the microphase-separated structure, in other words, when the degree of regularity of structural period of the microphase-separated structure is low, the microphase-separated structure is easily distorted by gelation and sometimes fails to show a structural color. In addition, the immobilized microphase-separated structure is in a gel form and has temperature characteristics.

Next, (3) an optical device having the microphase-separated structure prepared by these methods will be described by way of specific embodiments. Note that a laser dye is suitably used as a laser medium in the present invention.

Embodiment 3 is directed to a wavelength-variable laser oscillator, which is constituted of the microphase-separated structure according to Embodiment 1 containing a laser dye and placed in a transparent cell, a heating/cooling element and an excitation source, wherein the temperature of the heating/cooling element can be arbitrarily controlled temporally or spatially by an exterior power source or signal source and the excitation source is an excitation light source which optically excites the laser dye to cause oscillation or a driving power source which electronically excites the laser dye to cause oscillation. The laser dye used herein may include a rhodamine derivative, a fluorescein derivative and a coumarin derivative. As the heating/cooling element, a Peltier element may be mentioned.

In the aforementioned embodiment, as the excitation light source, a laser light source, an electric bulb, a fluorescent lamp, an LED, a luminescent dye, a semiconductor and an organic EL may be mentioned. When the microphase-separated structure is in a solution state, it is placed in a transparent glass cell.

Embodiment 4 is directed to a temperature sensor capable of measuring the peripheral temperature of a cell containing the microphase-separated structure according to the first aspect of the present invention. The temperature sensor is constituted of a laser oscillator and a spectroscopic measurement unit, wherein the laser oscillator is constituted of the microphase-separated structure according to Embodiment 1 containing a laser dye and placed in a transparent cell, and an excitation source. The excitation source is an excitation light source which optically excites the laser dye to cause oscillation or a driving power source which electronically excites the laser dye to cause oscillation. The spectroscopic measurement unit optically guides the oscillated laser light to a site at which the laser light is required and the wavelength thereof is spectroscopically analyzed.

When the temperature of the microphase-separated structure used herein slightly changes within a certain temperature range, a wavelength of structural color, in other words, cavity length, greatly changes. As a result, the laser oscillation wavelength changes. Therefore, the sensor according to Embodiment 4 can accurately measure the peripheral temperature of a cell containing the microphase-separated structure.

In Embodiment 5, there is provided a light filter constituted of a transparent cell equipped with a heating/cooling element and containing the microphase-separated structure according to Embodiment 1, a monochromatic light source, a spectroscopic detector and an analyzer, wherein the heating/cooling element can be arbitrarily controlled temporally or spatially by an exterior power source or signal source; the monochromatic light source is constituted of at least two types of monochromatic light beams; the spectroscopic detector can separately detect the wavelengths of monochromatic light beams passed through the cell; and the analyzer outputs the signal from the spectroscopic detector as an exterior signal.

The microphase-separated structure used herein greatly changes in transmission characteristic within a certain temperature range. Therefore, it functions as a temperature-dependent light filter which transmits or does not transmit at least two types of monochromatic light beams depending upon the temperature.

EXAMPLES

The present invention will be more specifically described by way of Examples below; however the scope of the present invention will not be limited by these Examples.

Example 1

As a block copolymer sample, PS (polystyrene)-b-PMMA (polymethylmethacrylate) was used. The sample used herein was synthesized by living anionic polymerization under vacuum (weight average molecular weight=$7.5 \times 10^5$ g/mol, the composition ratio of PS:PMMA=70:30 vol %).

The sample was dissolved in THF serving as a good solvent so as to obtain a concentration 10 wt % to prepare a dilute solution. While the solution was stirred, water serving as a poor solvent was added to a concentration of 6.2 to 9.1 wt %. As a result, a structural color was observed. When the visible-light reflection spectrum of the solution showing a structural color at 300K was measured, a shape peak derived from the structural period of the microphase-separated structure was observed at 540 nm to 580 nm (FIG. 1). The numerical values noted in FIG. 1 indicate weight fractions of water in copolymer solutions.

When the temperature of the solution showing a structural color was slowly and uniformly changed from 40° C. to 0° C. and a reflection spectrum was measured, it was observed that the wavelength of the structural color changes with temperature and the temperature dependence of reflection wavelength greatly varies depending upon the concentration of water serving as a poor solvent (FIG. 2). The numerical values noted in FIG. 2 indicate weight fractions of water in copolymer solutions.

The curves (a concentration of water from 9.1 to 9.4 wt %) are regarded as those of microphase-separated structures having a large temperature dependence, that is, a reflection wavelength greatly shifts by 30 to 60 nm in the proximity of 20° C. to 35° C. The curves (a concentration of water from 6.2 to 7.7 wt %) are regarded as those of microphase-separated structures having no temperature dependence, that is, a reflection wavelength does not change at all within the aforementioned temperature range.

As described above, the temperature dependence of a microphase-separated structure can be easily controlled simply by selecting the concentration of a poor solvent in a solvent mixture.

In this solution, a reflection wavelength, that is, a cavity length, changes with temperature, as shown in FIG. 2. Furthermore, the cavity length abruptly changes within a narrow temperature range from 293K to 296K. The results indicate that oscillation wavelength can be dramatically changed by varying temperature slightly if a microphase-separated structure is used as a resonator.

Example 2

As a block copolymer sample, PS (polystyrene)-b-PI (polyisoprene) was used. The sample used herein was synthesized by living anionic polymerization under vacuum (weight average molecular weight=$10\times10^5$ g/mol, the composition ratio of PS:PI=35:65 vol %).

The sample was dissolved in cyclohexane serving as a selective solvent to PS so as to obtain a concentration of 7.5 to 8.5 wt % to prepare a dilute solution showing a structural color. The temperature of the obtained solution was changed within the range of 10 to 50° C. and a visible-light reflection spectrum was measured. In the curves (a sample concentration of 7.5 to 8.0 wt %), reflection wavelength greatly changes in the proximity of 34.5° C.=308K, which is θ temperature of PS to cyclohexane (FIG. 3). The numerical values noted in FIG. 3 indicate weight fractions of a copolymer in solutions.

As described above, the temperature dependence of a microphase-separated structure can be easily controlled by slightly varying the concentration of a polymer in a solution.

Comparative Example 1

A visible-light reflection spectrum (FIG. 4) was obtained in the same manner as in Example 2 except that a sample was dissolved in a toluene serving as a good solvent to both PS and PI in a predetermined amount (10 to 12% by mass). Even if the concentration of a polymer in a solution is changed, the wavelength simply changes gently and monotonously with temperature in such a good solvent, unlike Examples 1 and 2. From this, it is found that the temperature dependence cannot be controlled. The numerical values noted in FIG. 4 indicate weight fractions of a copolymer in solutions.

Example 3

As a block copolymer sample, PS (polystyrene)-b-PB (polybutadiene) was used. The sample used herein was synthesized by living anionic polymerization at low temperature under vacuum (weight average molecular weight=$12\times10^5$ g/mol, the composition ratio of PS:PB=56:44 vol %).

The sample was dissolved in cyclohexane serving as a selective solvent so as to obtain a concentration 3% by mass to prepare a dilute solution. Furthermore, a photopolymerization initiator, IRGACURE 651 (manufactured by Ciba Speciality Chemicals) was dissolved with stirring up to 2% by mass relative to the sample. The solution was allowed to stand still at room temperature (23° C.) for about 12 hours, an opalescent structural color, which indicates generation of a microphase-separated structure, and generation of giant grains of about 1 to 3 mm was observed (FIG. 5). When visible-light reflection spectrum was measured, an extremely sharp peak was observed in the proximity of 470 nm (FIG. 6).

The solution was irradiated with UV by use of a UV-LED lamp of 365 nm in wavelength at room temperature for 20 minutes. As a result, completely gel-like immobilized microphase-separated structure was obtained without changing the opalescent structural color. When the reflection spectrum of the gel-like immobilized structure was measured, the reflection wavelength slightly shifted toward the lower wavelength side but an extremely sharp peak was observed. The presence of a microphase-separated structure was confirmed (FIG. 6). The note "before crosslinking" shown in FIG. 6 indicates the spectrum of the solution, whereas the note "after crosslinking" indicates the spectrum of the solution after irradiated with UV for 20 minutes. When the spectra before and after gelation were compared by reducing plot, they are closely analogous and half-width-at-half-maximum does not change so much. From these, it was confirmed that the regularity of the microphase-separated structure does not change (FIG. 7). The note "before crosslinking" shown in FIG. 7 indicates the spectrum of the solution, whereas the note "after crosslinking" indicates the spectrum of the solution after irradiated with UV for 20 minutes. Note that "reducing plot" means plotting data converted by normalizing the vertical axis by the visible-light reflection spectrum peak area and normalizing the horizontal axis by the visible-light reflection spectrum peak wavelength.

Example 4

An immobilized microphase-separated structure was obtained in the same manner as in Example 1 except that the sample synthesized in Example 3 was dissolved in a selective solvent, cyclohexane, so as to obtain a concentration of 8% by mass to prepare a dilute solution; that a photopolymerization initiator, IRGACURE 651 (manufactured by Ciba Speciality Chemicals) was further dissolved with stirring up to 5% by mass relative to the sample; and that the solution allowed to stand still was irradiated with UV by use of a mercury lamp H-400P for physicochemical use (manufactured by Toshiba Corporation). The visible-light reflection spectrum of obtained gel-like immobilized structure is shown in FIG. 8 and the spectrum obtained by reducing plot is shown in FIG. 9.

Comparative Example 2

As a block copolymer sample, PS (polystyrene)-b-PB (polybutadiene) was synthesized by living anionic polymerization at low temperature (weight average molecular weight=$6.8\times10^5$ g/mol, the composition ratio of PS:PB=52:48 vol %).

The sample was dissolved in a good solvent, THF, so as to obtain a concentration of 14% by mass to prepare a dilute solution. Furthermore, a photopolymerization initiator, 1,1-di-(t-butylperoxy)-3,3,5-trimethylcyclohexane was dissolved with stirring up to 13% by mass relative to the block copolymer. After the solution was allowed to stand still at room temperature (23° C.) for about 12 hours, the solution was irradiated with UV by use of a mercury lamp H-400P for physicochemical use (manufactured by Toshiba Corporation) at room temperature for 60 minutes to obtain a gelled substance.

When the reflection spectrum was measured, the reflection wavelength greatly shifted toward the lower wavelength side and an extremely broad peak was obtained (FIG. 10). When the spectra before and after gelation were compared by reducing plot, it was confirmed that the degree of the regularity of the microphase-separated structure is clearly decreased (FIG. 11). Note that the note "pure" shown in FIGS. 10 and 11 represents the sample before a photopolymerization initiator is added and the note "after crosslinking" is the sample irradiated with UV.

An optical device using the nature of the microphase-separated structure, that is, the spectrum of a structural color greatly varies by changing the temperature, disclosed in the present invention will be exemplified.

Reference Example 1

Laser Oscillator Using a Block Copolymer

As a block copolymer sample, PS (polystyrene)-b-Pt-BuMA (poly-t-butyl methacrylate) was used, which was synthesized by living anionic polymerization under vacuum (weight average molecular weight=$14.7 \times 10^5$ g/mol, the composition ratio of PS:PtBuMA=35:65 vol %).

A solution was prepared such that a weight ratio of PS-b-PtBuMA:tetrahydrofuran (THF): water became 8.1:87.5:4.4. Furthermore, rhodamine 6G serving as a laser dye was added up to a concentration of 0.05% by mass. The solution was placed in a glass cell, enclosed and allowed to stand still to form a microphase-separated structure. In other words, a laser resonator was formed. When a reflection spectrum of the solution was measured, it can be confirmed that a peak appears at 570 nm in the resonator structure formed, as shown in FIG. 12.

The solution was excited by a pulse laser (Nd:YAG laser with a second harmonic generation at 532 nm, pulse width of 10 nsec, repetition rate at 20 Hz, respectively) as an excitation light source. In increasing an excitation light source power, an oscillated laser was observed. The emission spectrum of the oscillated laser is shown in FIG. 13. FIG. 14 shows the pump power (the excitation power) dependence of emission intensity. The emission spectrum has a sharp peak at a wavelength of 575 nm. The emission intensity abruptly increases at a pump power of about 0.2 mW. From these, it was confirmed that laser oscillates from the solution using a microphase-separated structure as a resonator.

Example 5

Wavelength-Variable Oscillator

In FIG. 15, a transparent cell 1 contains the solution having the microphase-separated structure (a weight ratio of PS-b-PMMA:THF:water=81.81:9.09:9.1) described in Example 1. To the solution, a laser dye, rhodamine 6G, was added up to 0.04% by mass relative to the solution. A heating/cooling element 4 (Peltier element) of FIG. 15 was arranged so as to control the temperature of the cell 1. The surface of the cell 1 is formed of a material applied with an optical treatment required in the wavelength region used herein, such as non-reflective coating.

An excitation light source 2 is used for optically exciting the cell 1 containing a laser dye to cause laser oscillation (for example, when rhodamine 6G is used as the laser dye, the second harmonic generation of Nd:YAG laser that can provide a wavelength of 532 nm). Excitation light 3 emitted from the excitation light source 2 was applied to the cell 1 containing the laser dye and a laser resonator structure to cause laser oscillation.

The cavity length formed in the cell 1 changes with temperature as shown in FIG. 2. Therefore, an output-wavelength controllable laser oscillator with temperature is obtained. The temperature of the cell 1 which contains the solution having a temperature dependence and represented by a square symbol in FIG. 2 and containing rhodamine 6G was set at 294K, laser light 6 having a wavelength of 607 nm was obtained by oscillation. At 296K, laser light 6 having a wavelength of 576 nm was obtained by oscillation. It should be noted that structures such as a laser medium and excitation light source are not limited to those specifically described herein. For example, when a laser crystal and a semiconductor laser structural material are used as the laser medium, an electron source or a current source may be used in place of the light source.

Example 6

When the intensity of the excitation light 3 in Example 5 was lower than a laser threshold, the light having a wavelength corresponding to the formed laser cavity length, in other words, a photonic band gap among the fluorescence emitted in the microphase-separated structure described in Example 5 was not able to leak out of the cell 1. In the resultant luminescence spectrum at 295K, a specific wavelength as shown in FIG. 16 was removed. The reflection spectrum shown in FIG. 16 is the spectrum of the microphase-separated structure described in Example 1 at 295K and used for demonstrating the aforementioned mechanism.

Example 7

Temperature Sensor

In FIG. 17, a cell 1, an excitation light source 2 and an excitation light 3 are formed of the same materials as in Example 5. The cell 1 is arranged in contact with a pipe 5, whose temperature is detected, such that the temperature of a medium (such as a gas or cooling water) in the pipe 5 is conducted to the cell 1. The surface of the cell 1 is formed of a material applied with an optical treatment required in the wavelength region used herein, such as nonreflective coating.

The excitation light 3 emitted from the excitation light source 2 was applied to the cell 1 in the same manner as in Example 5 to cause laser oscillation. The cell 1 contains the microphase-separated structure (cavity length changes with temperature) as described in Example 1. The wavelength of the laser light emitted from the cell 1 by oscillation changes depending upon, the temperature of the medium flowing through the pipe 5. The laser may be detected by a spectroscopic detector 8 capable of directly dispersing wavelength or may be spectroscopically detected through an optical fiber 7. When water of 294K was supplied to the pipe 5, the laser light 6 had a wavelength of 607 nm. When water of 305K was supplied, the wavelength was 565 nm.

The temperature sensor is applied to devices for measuring the ambient temperature of an object whose temperature is to be detected, controlling the temperature and displaying a temperature change by a color and characterized by being capable of measuring the temperature by use of laser light at remote sites. It should be noted that the structures such as a laser medium and excitation light source are not limited to those specifically described herein. For example, when a laser crystal and a semiconductor laser structural material are used as the laser medium, an electron source or a current source may be used in place of the light source.

Example 8

Light Filter

As shown in FIG. 18, a heating/cooling element 4 that can be controlled by an exterior power source or signal source is provided around an optically transparent cell 9, which contains a microphase-separated structure solution prepared by adding water to a 10% by mass tetrahydrofuran solution of polystyrene-polymethylmethacrylate block copolymer described in Example 1 so as to obtain a concentration of 9.1% by mass relative to the 10% by mass tetrahydrofuran solution. From monochromatic light sources 10 formed of a laser diode or a light emitting diode, a monochromatic light beam 11 having a wavelength of 610 nm and a monochromatic light 11 having a wavelength of 575 nm are allowed to emit and inject into the cell 9, separately. To the surface of the cell, a requisite optical performance such as optically nonreflective coating is applied. In consideration of the temperature response characteristic and optical characteristics, the thickness and size thereof can be appropriately controlled. The temperature of the cell is varied by changing the temperature of the heating/cooling element 4 based on the exterior power source or a signal from the signal source.

As a result, when the temperature is 20° C. or less, light of 610 nm is reflected and fails to pass through the cell. The light that can pass through is light of 575 nm alone. On the other hand, when the temperature is 22° C. or more, light of 575 nm is reflected and light of 610 nm alone can be passed through the cell (FIG. 18).

When different information items are superposed on respective laser light beams and transmitted, the device plays a role as a wavelength-selection light filter. The case where the cell 9 alone is used is introduced as a specific example herein. However, it should be noted that a multi wavelength selection filter capable of selecting a plurality of laser wavelengths can be constituted by serially arranging cells containing microphase-separated structure solutions different in water amount (wavelength variation region is changed by changing the amount of water) as shown in FIG. 19.

INDUSTRIAL APPLICABILITY

When a photonic crystal utilizing the temperature controlling method of the microphase-separated structure of the present invention, in particular, a tunable photonic crystal can be applied in electronic devices such as a wavelength-variable light emitting device, a polarizing plate, a diffraction grating and a high-density memory; and optical devices such as a light guide, a light filter and a glow switch element can be manufactured.

DESCRIPTION OF SYMBOLS

Figure 1:
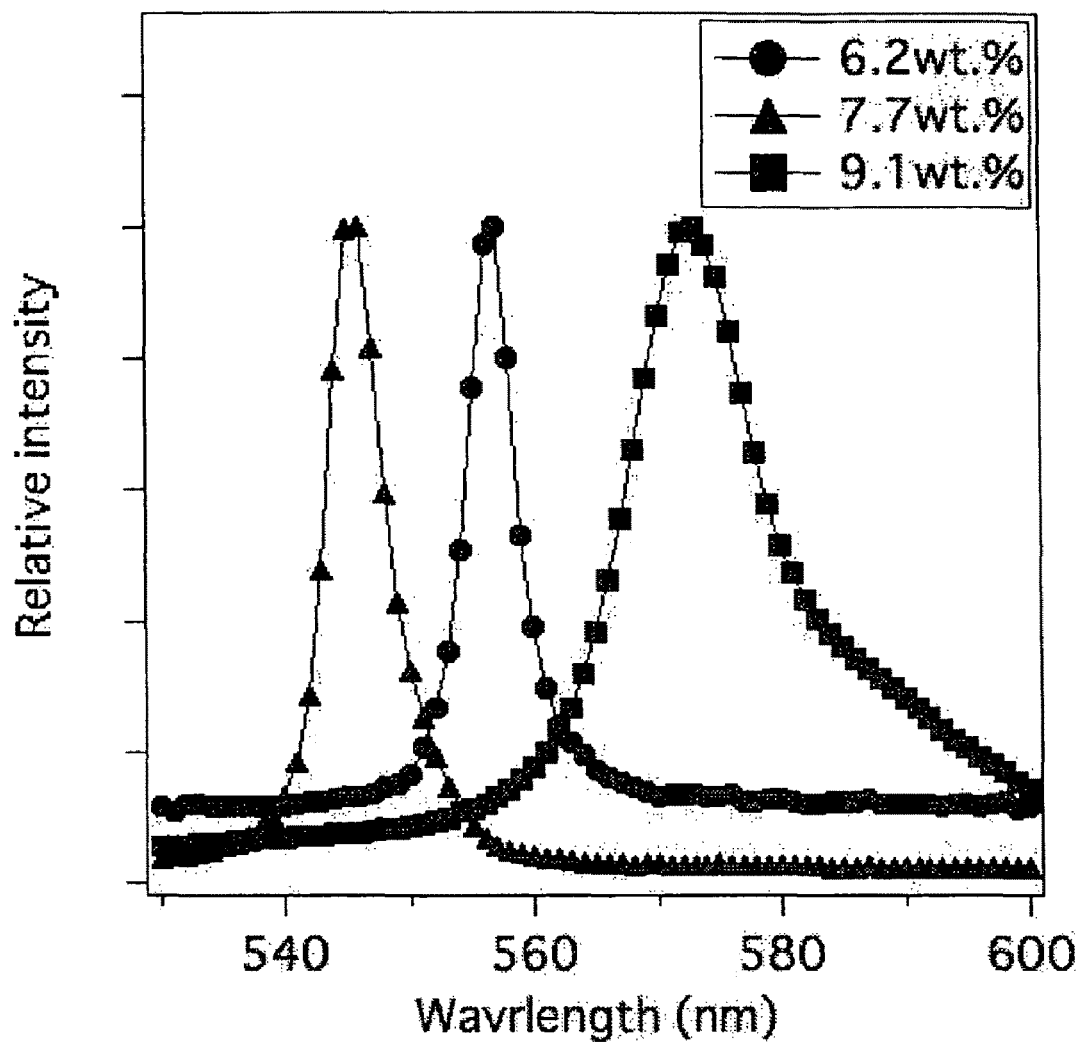
FIG. 1 is a graph showing the amount of water dependence of reflection spectra of a microphase-separated structure consisting of a THF/water mixture solution of PS-b-PMMA exhibiting a structural color upon the, at 300K, wherein the horizontal axis represents wavelength.
Figure 2:
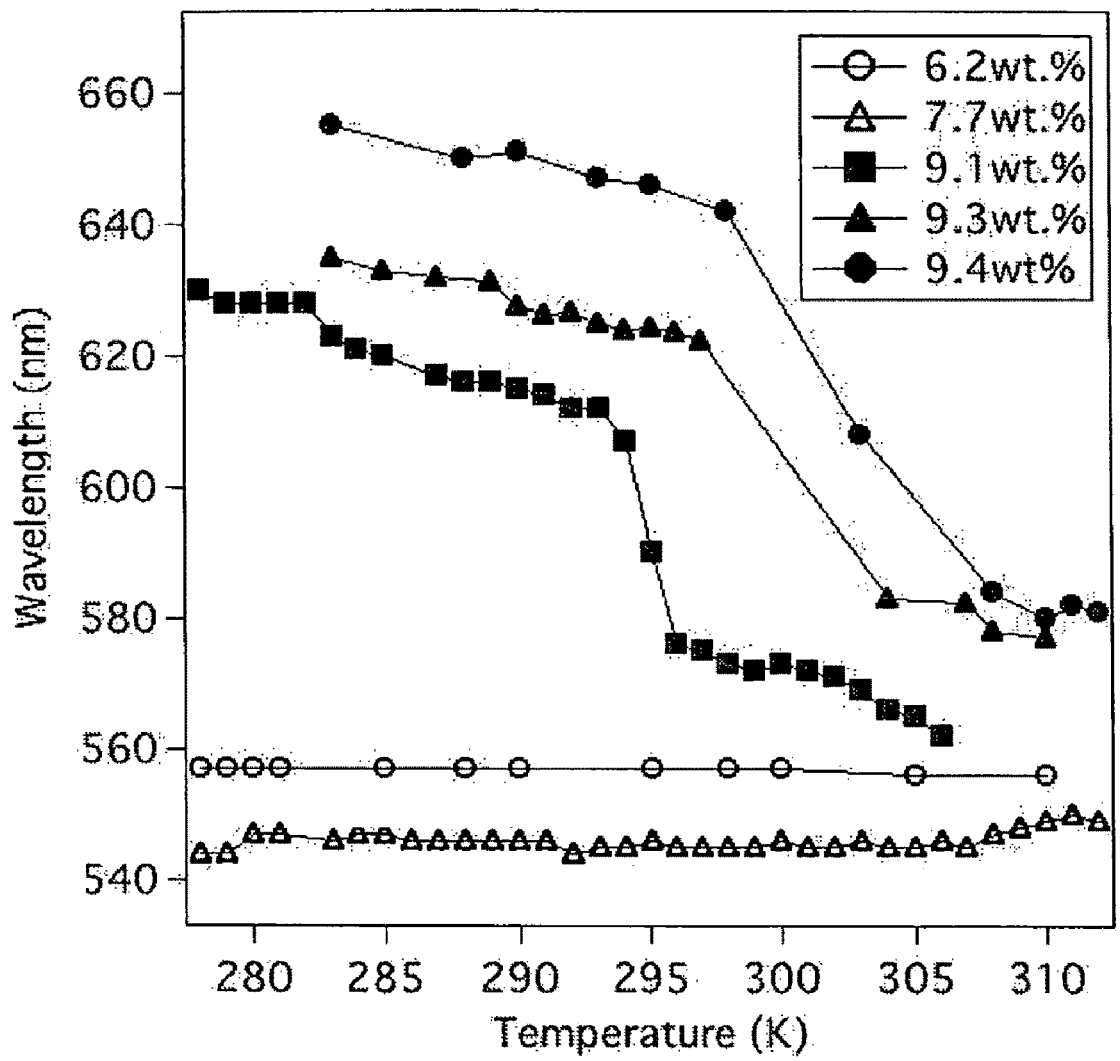
FIG. 2 is a graph showing the temperature dependence of maximum reflection wavelengths of the spectra of the solutions (FIG. 1) different in water concentration.
Figure 3:
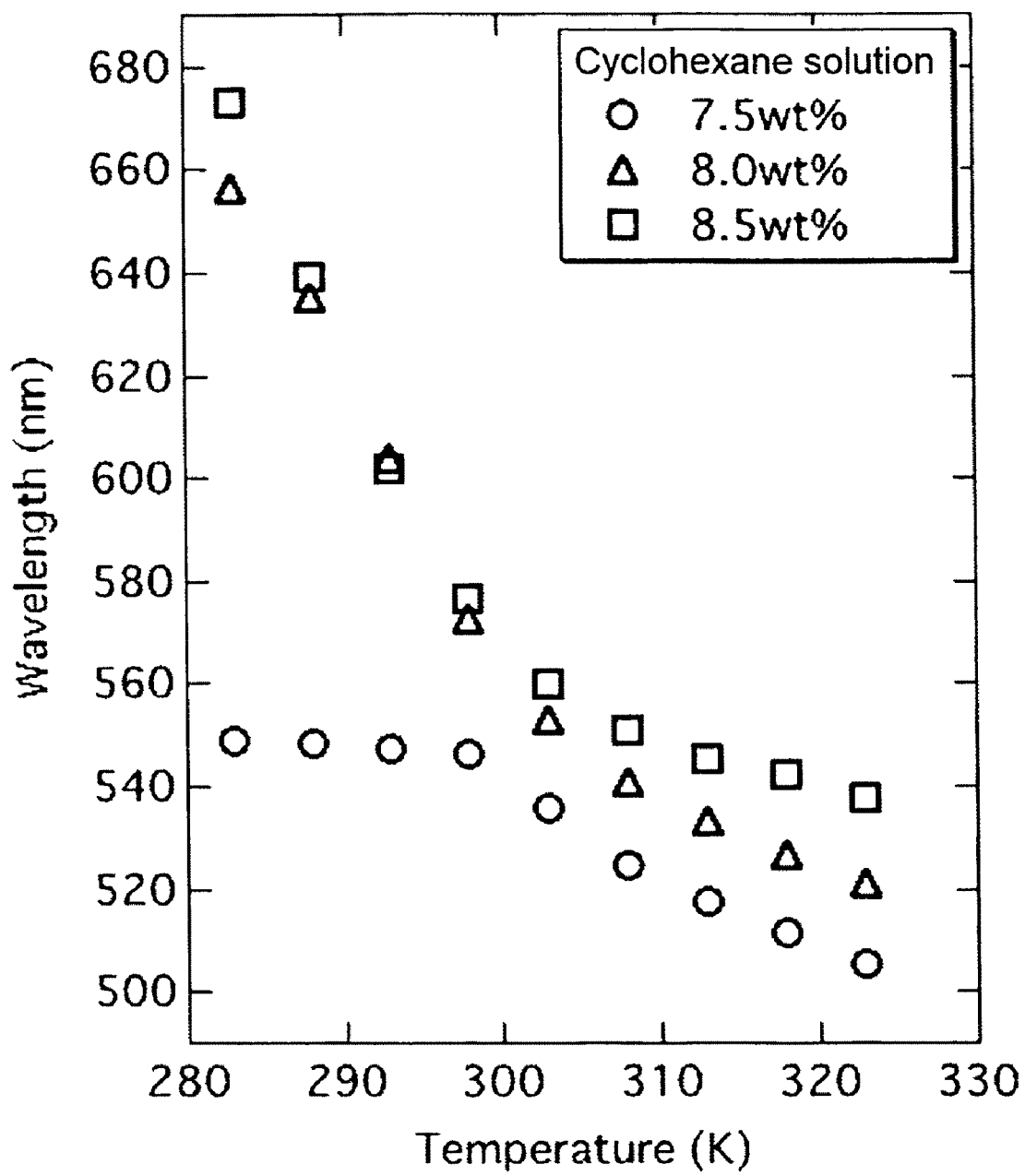
FIG. 3 is a graph showing the temperature dependence of maximum reflection wavelengths of the spectra of microphase-separated structures consisting of cyclohexane solutions of PS-b-PI showing a structural color and different in copolymer concentration.
Figure 4:
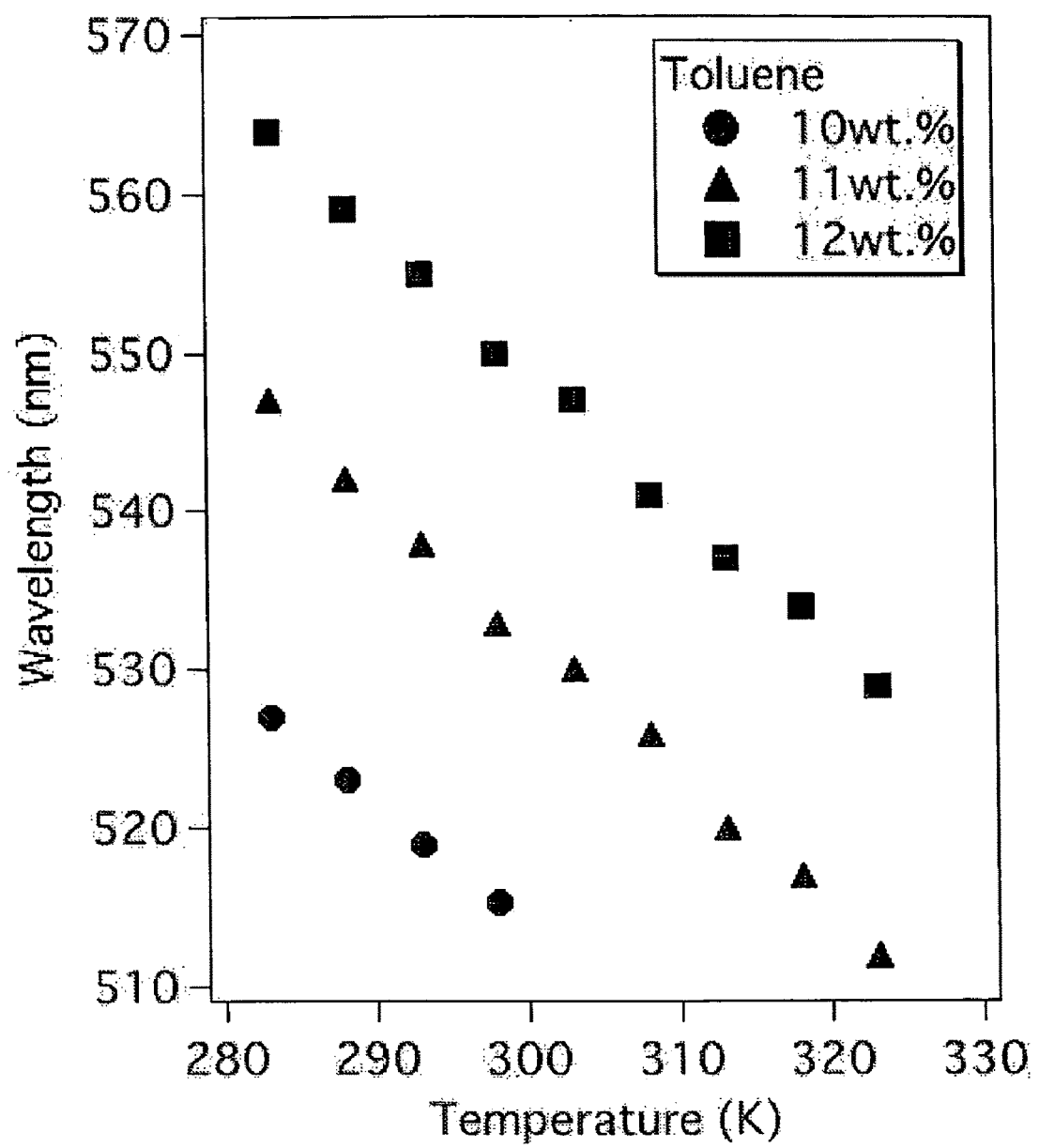
FIG. 4 is a graph showing the temperature dependence of maximum reflection wavelengths of the optical spectra of good-solvent toluene solutions different in copolymer concentration.
Figure 5:
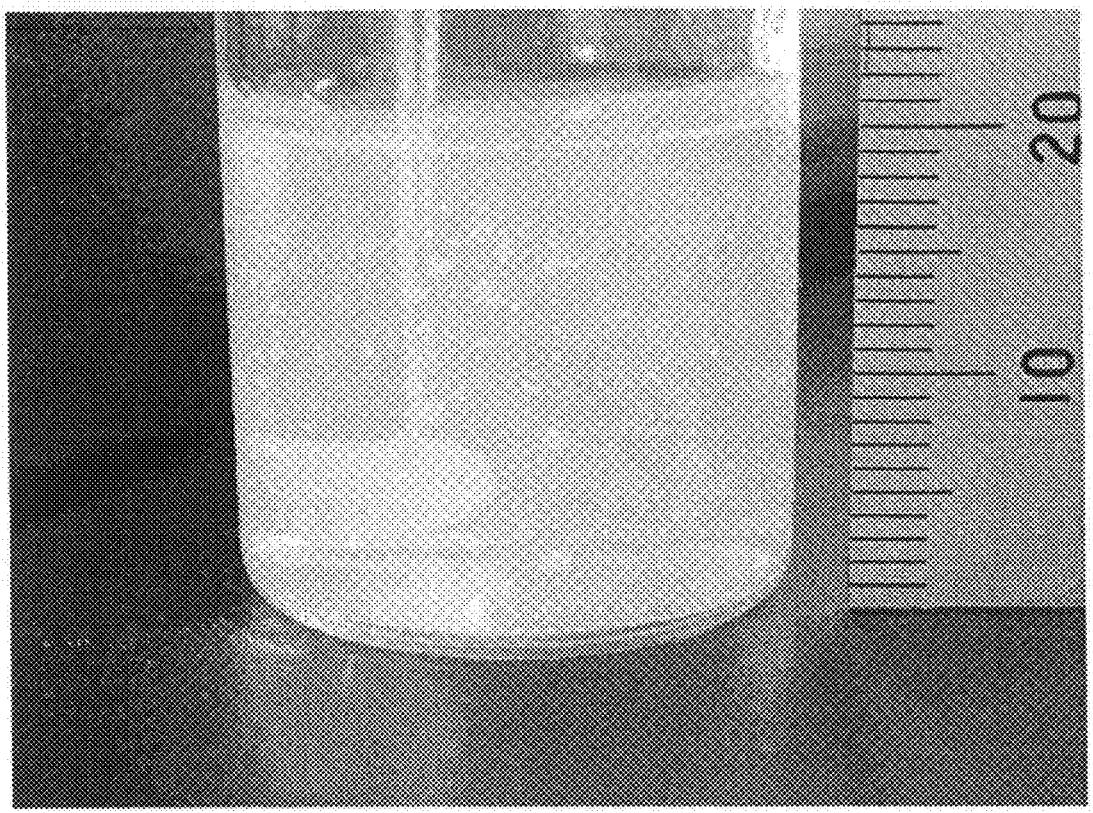
FIG. 5 is a photograph showing a 3 wt % cyclohexane solution of PS-b-PB (containing a photopolymerization initiator, IRGACURE 651), in which giant grains are observed. Note that one division of the scale represents 1 mm.
Figure 6:
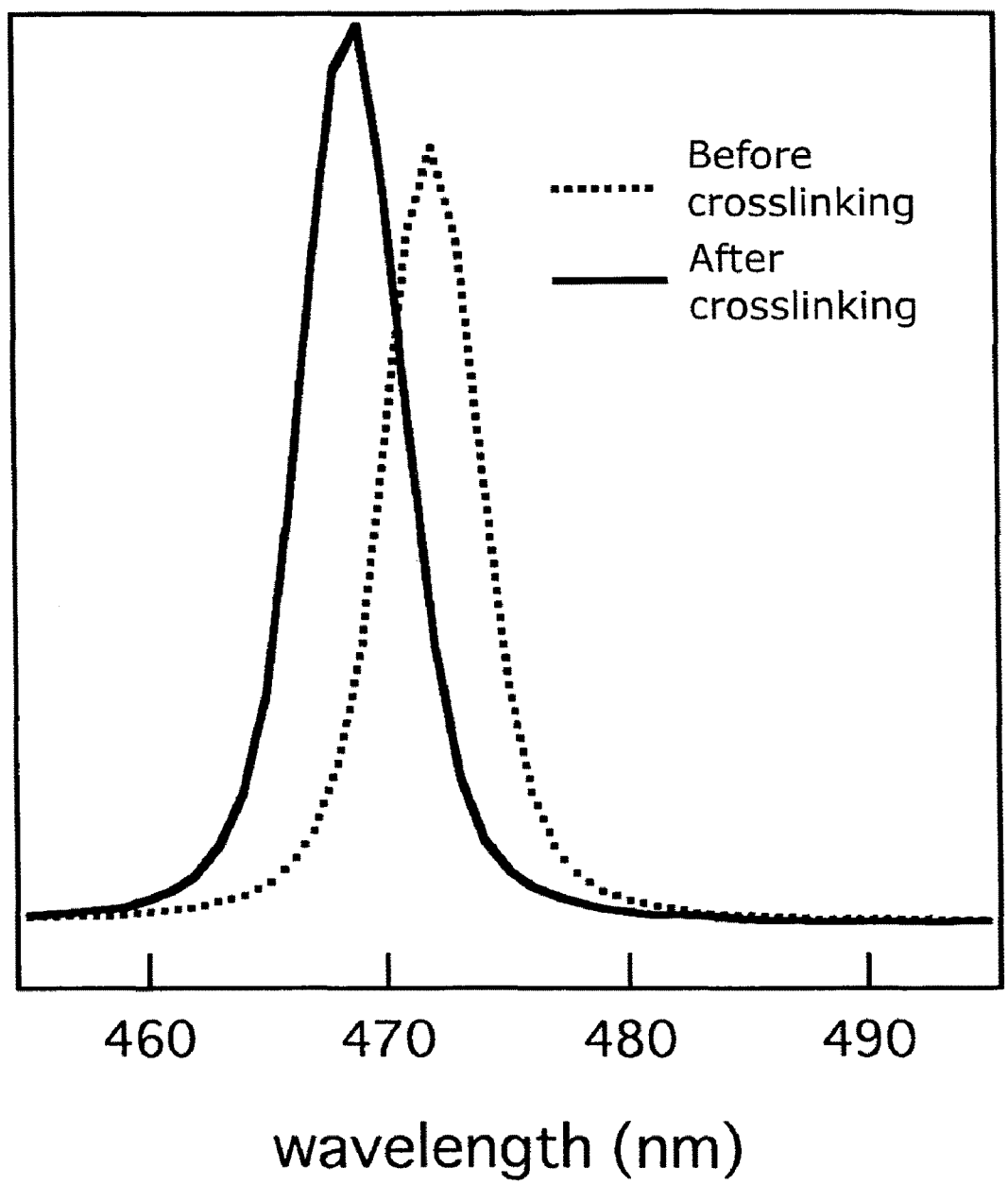
FIG. 6 is spectra of the solution of FIG. 5 and an immobilized gel-form microphase-separated structure obtained from the solution of FIG. 5.
Figure 7:
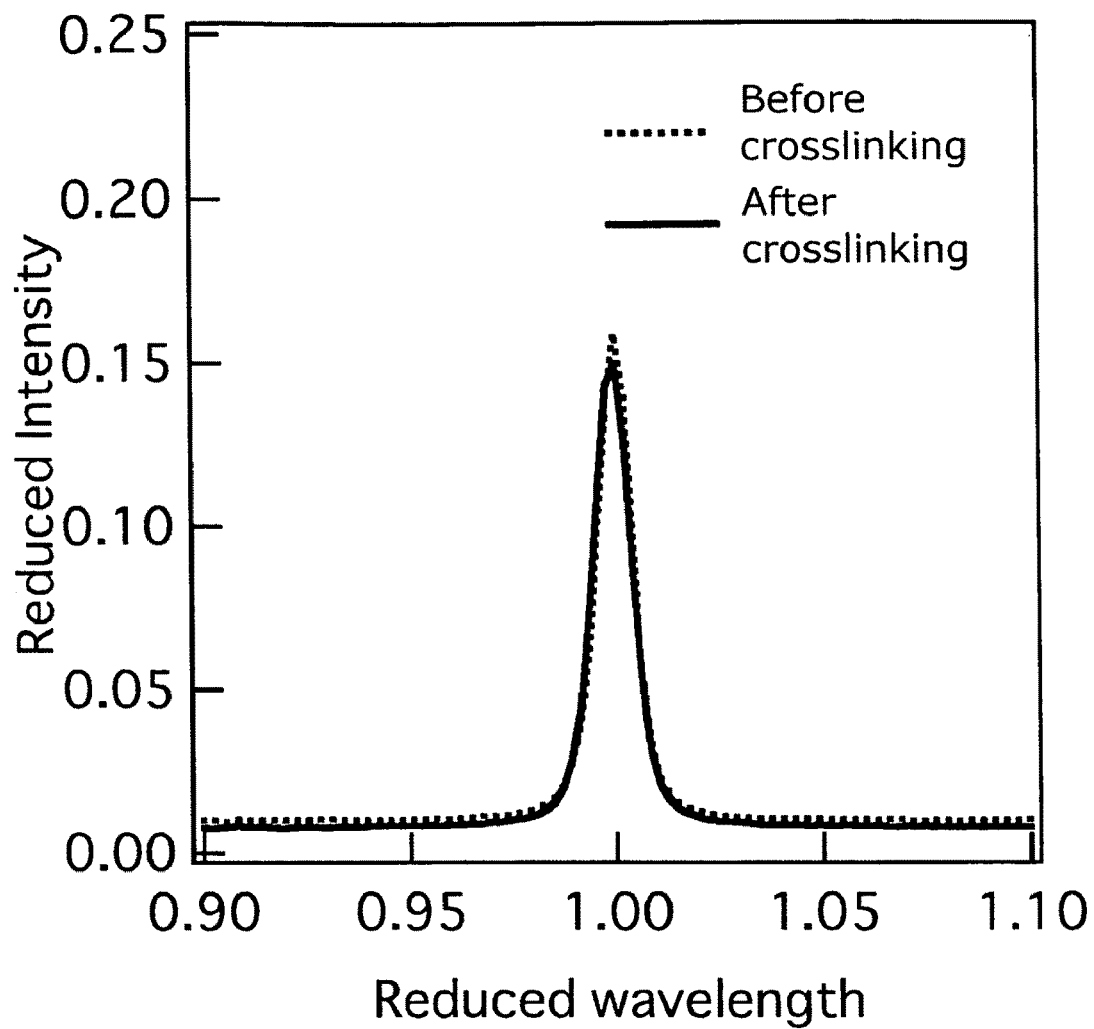
FIG. 7 is a graph obtained by reducing plot of the spectra of FIG. 6.
Figure 8:
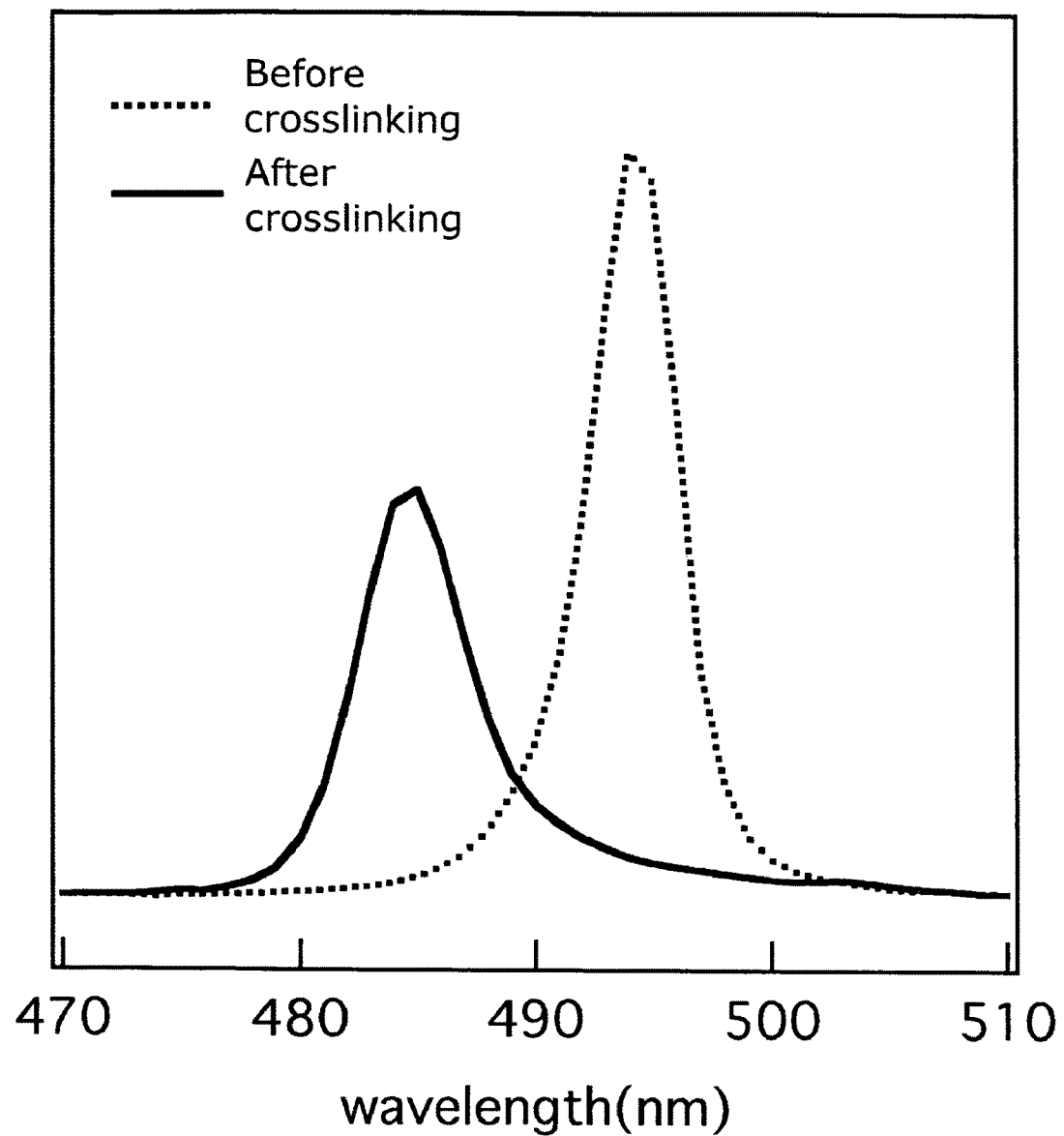
FIG. 8 is spectra of a 8 wt % cyclohexane solution of PS-b-PB (containing a photopolymerization initiator, IRGACURE 651) and an immobilized gel-form microphase-separated structure obtained from the solution.
Figure 9:
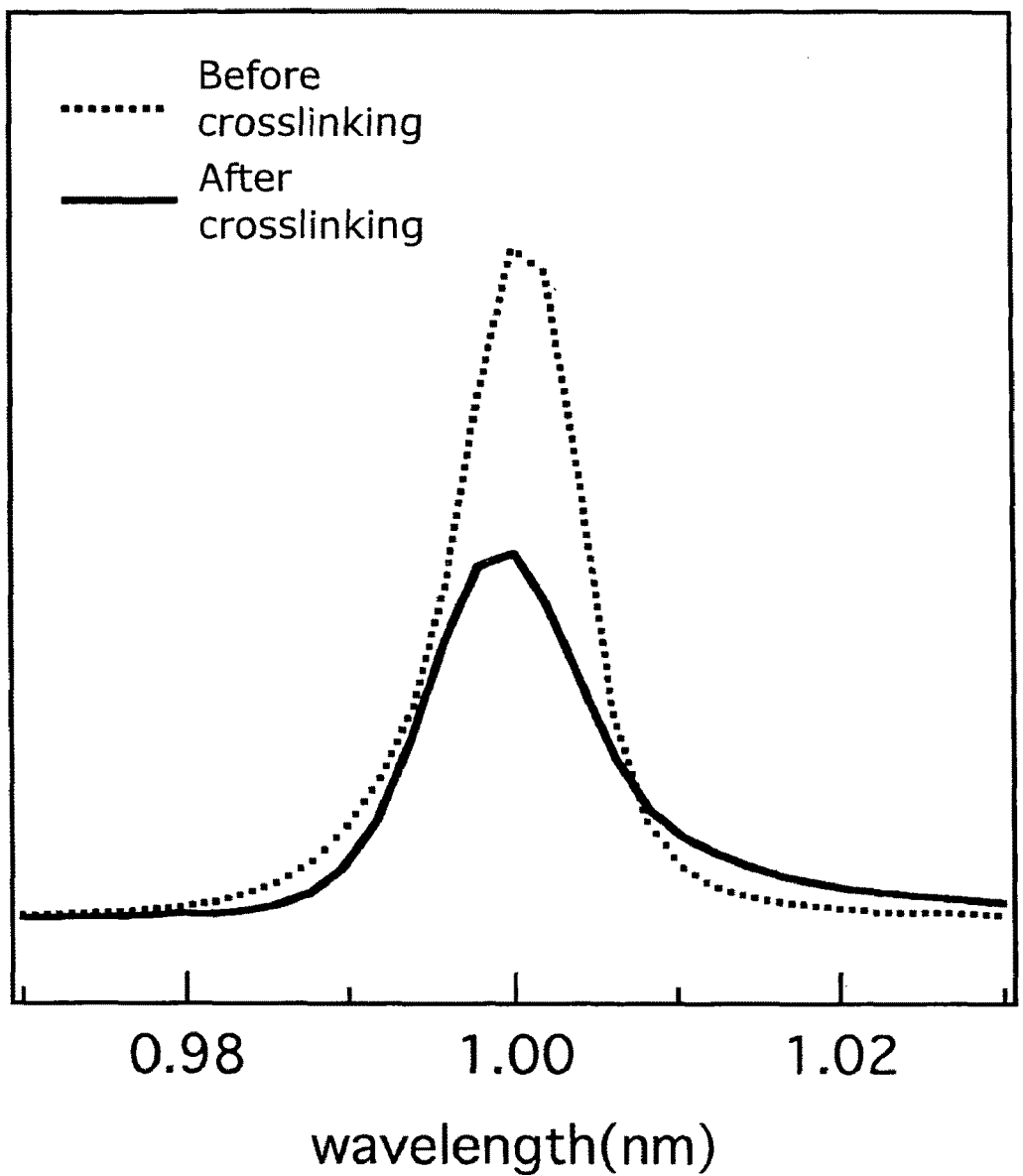
FIG. 9 is a graph obtained by reducing plot of the spectra of FIG. 8.
Figure 10:
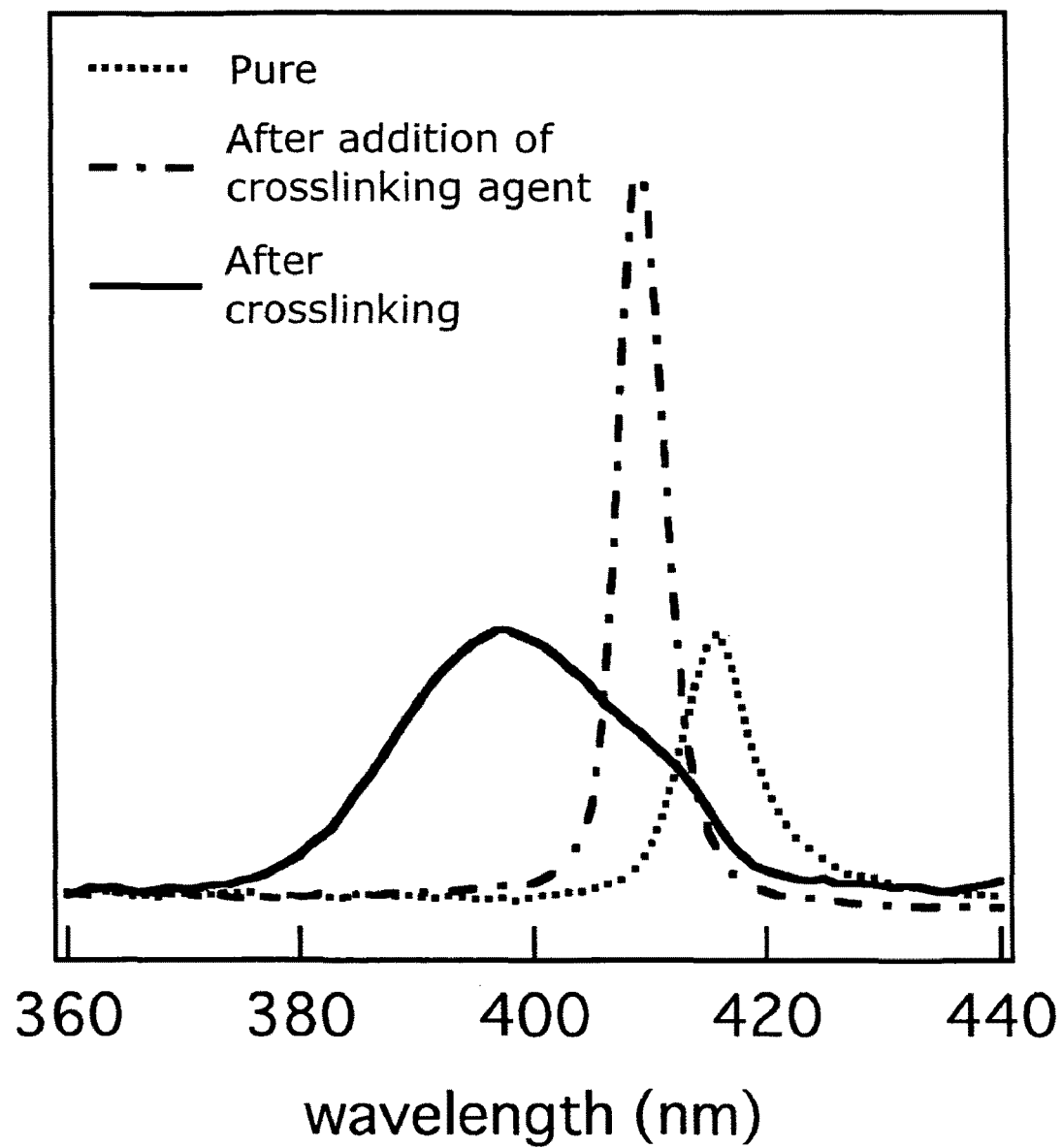
FIG. 10 is spectra of a 14% by mass THF solution of PS-b-PB (containing a photopolymerization initiator 1,1-di-(t-butylperoxy)-3,3,5-trimethylcyclohexane) and a immobilized gel-form microphase-separated structure obtained from the solution.
Figure 11:
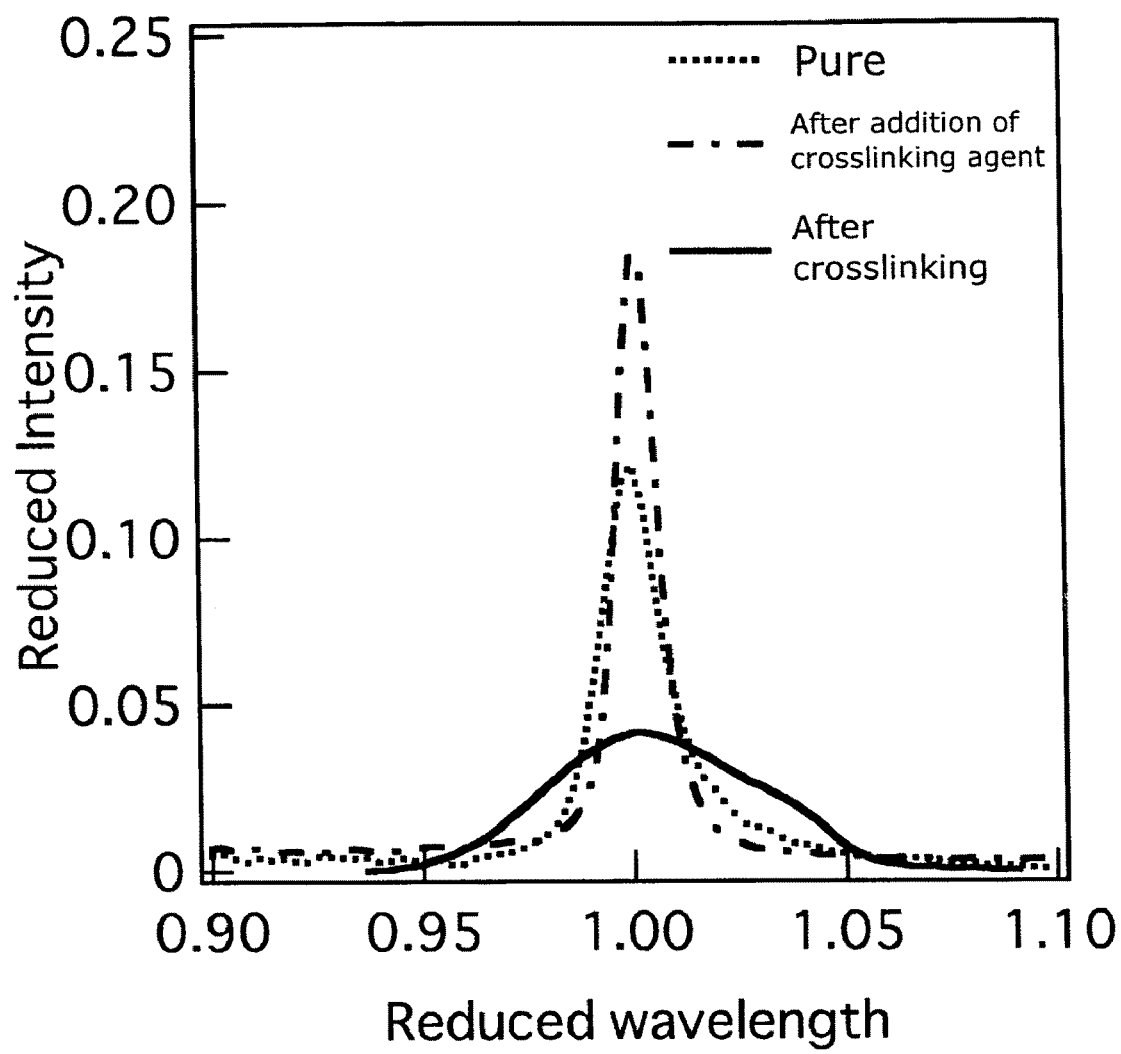
FIG. 11 is a graph obtained by reducing plot of the spectra of FIG. 10.
Figure 12:
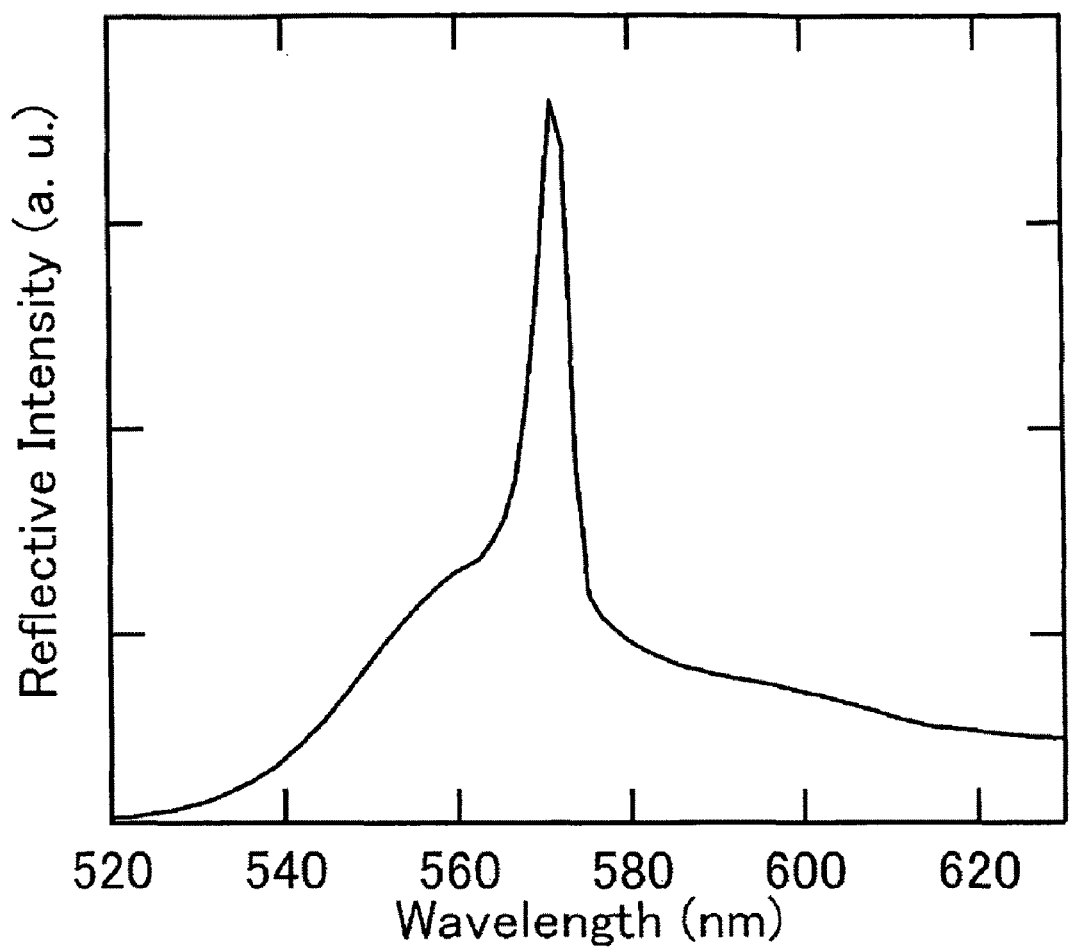
FIG. 12 is an reflection spectrum of a microphase-separated structure consisting of a THF/water mixture solution of PS-b-PtBuMA showing a structural color at 300K.
Figure 13:
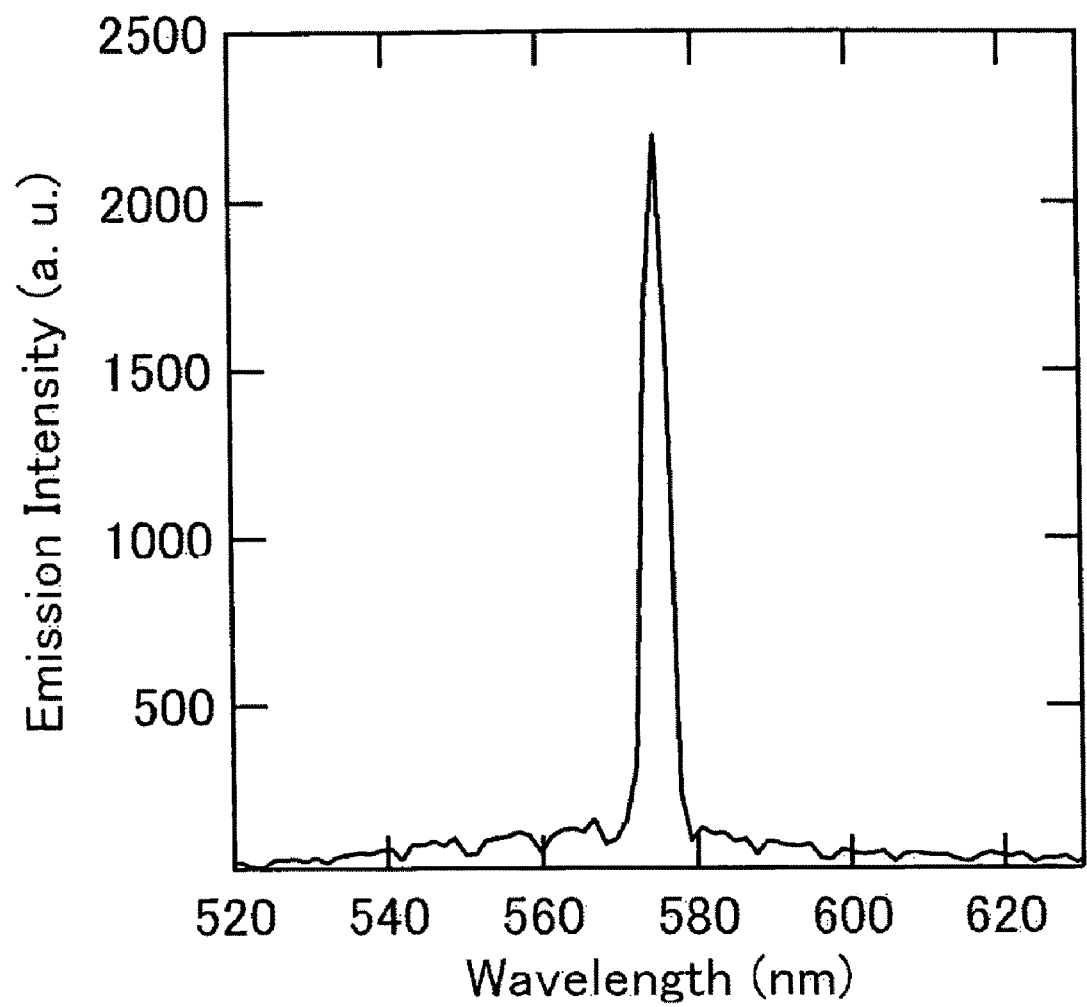
FIG. 13 is a spectrum of a laser oscillator in which the microphase-separated structure consisting of a THF/water mixture solution of PS-b-PtBuMA showing a structural color is used as a laser resonator.
Figure 14:
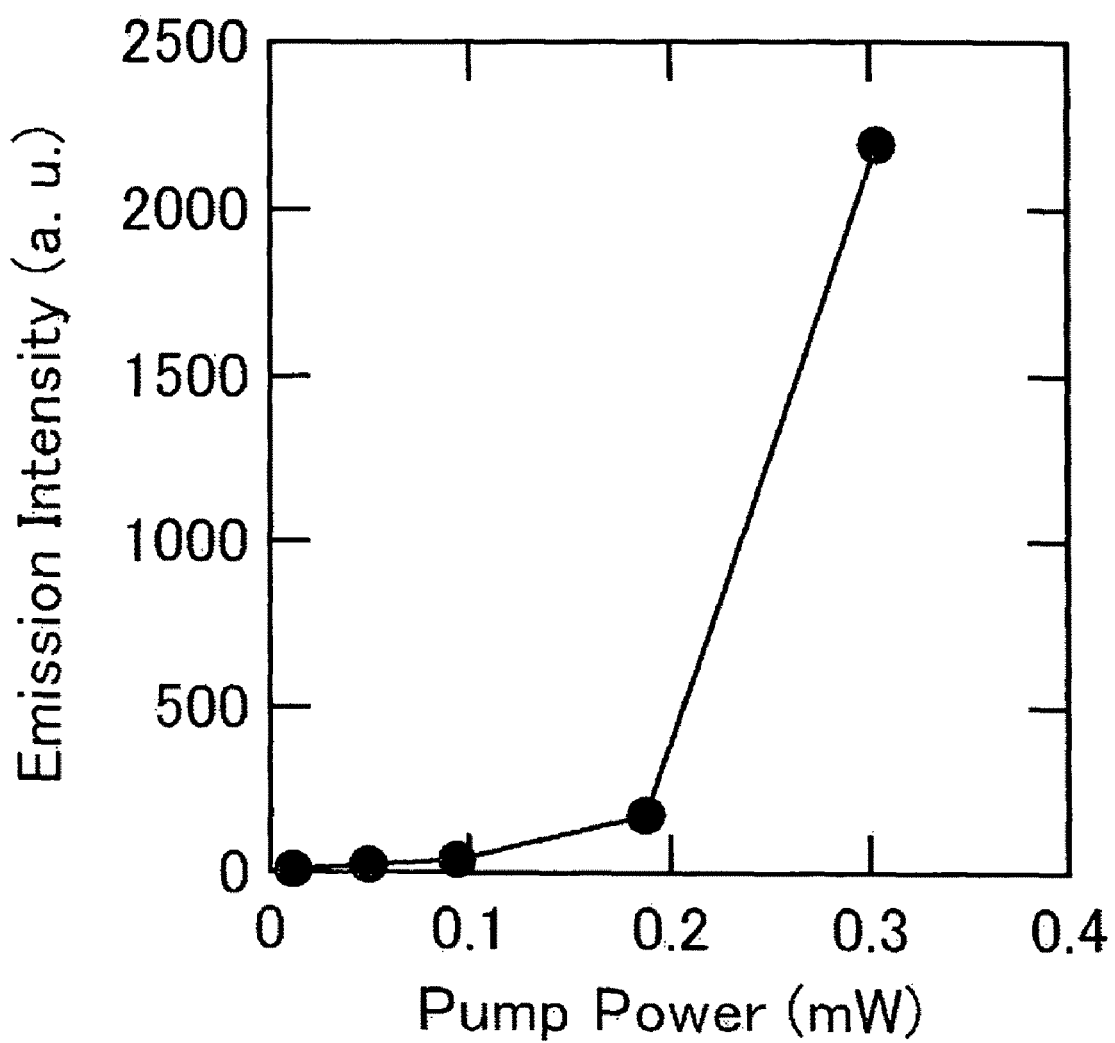
FIG. 14 is a graph showing the pump power dependence of the emission intensity of a laser oscillator using the microphase-separated structure consisting of a THF/water mixture solution of PS-b-PtBuMA showing a structural color upon pump power.
Figure 15:
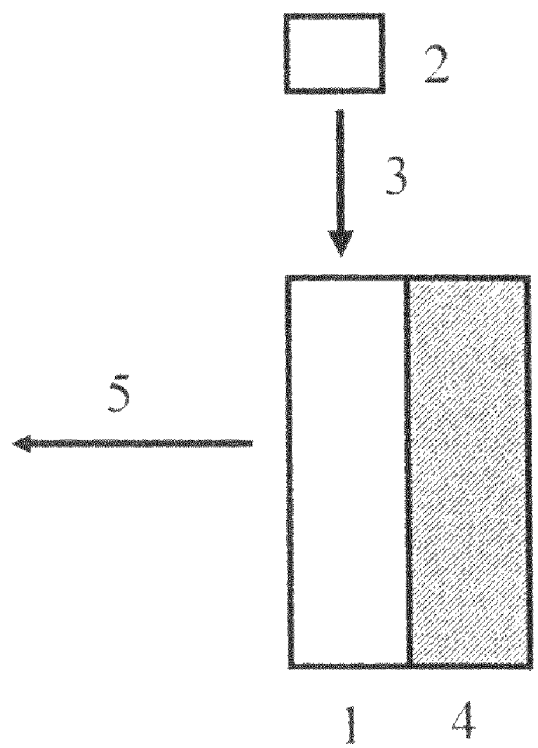
FIG. 15 is an illustration of a wavelength-variable laser oscillator constituted of a microphase-separated structure containing a laser dye, an excitation light source and a heating/cooling element.
Figure 16:
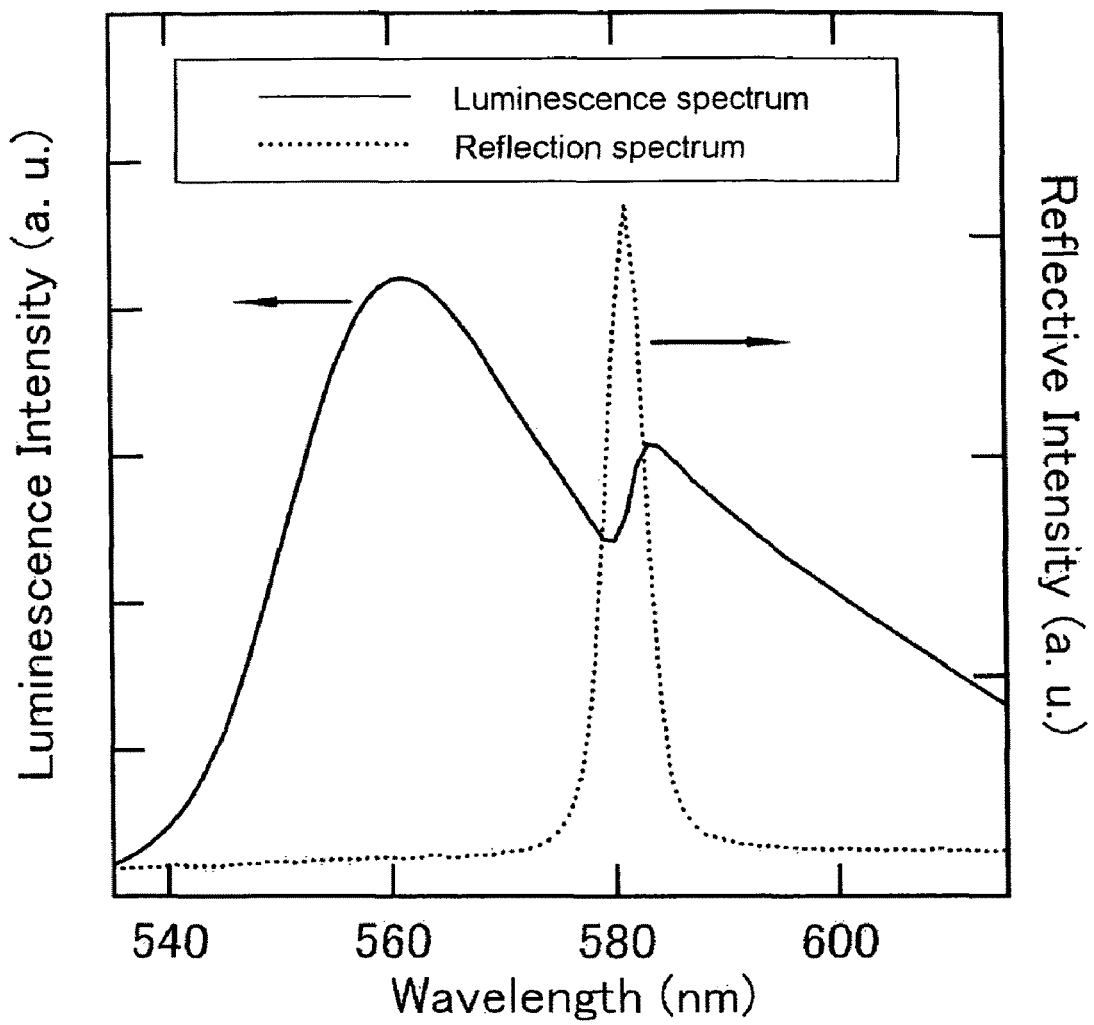
FIG. 16 is a spectra of the case where the intensity of excitation light is lower than a laser threshold.
Figure 17:
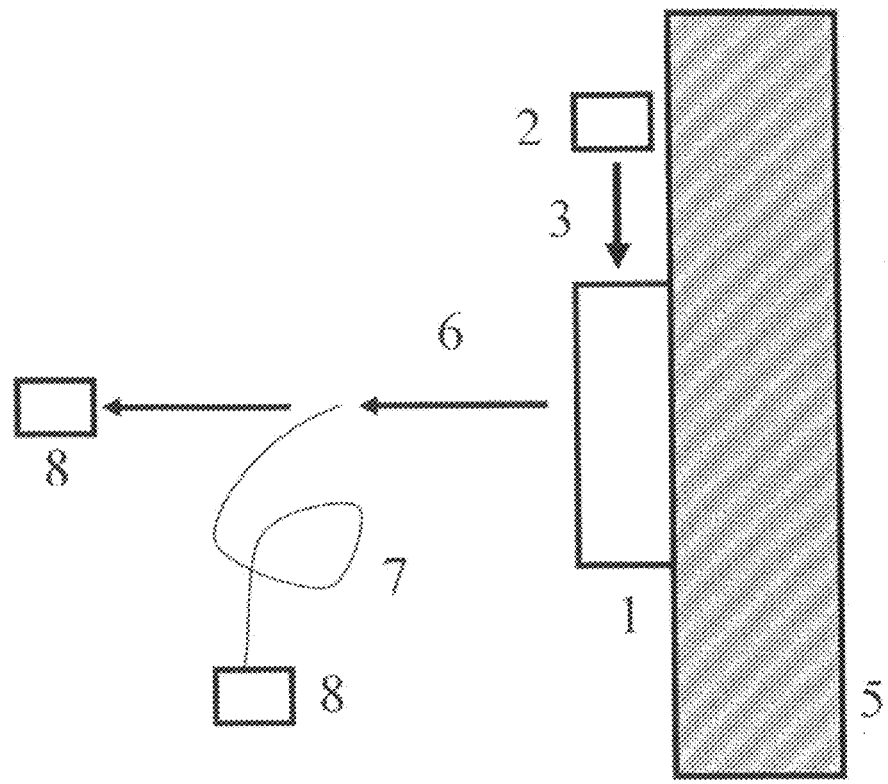
FIG. 17 is an illustration of a temperature sensor constituted of a microphase-separated structure containing a laser dye and an excitation light source.
Figure 18:
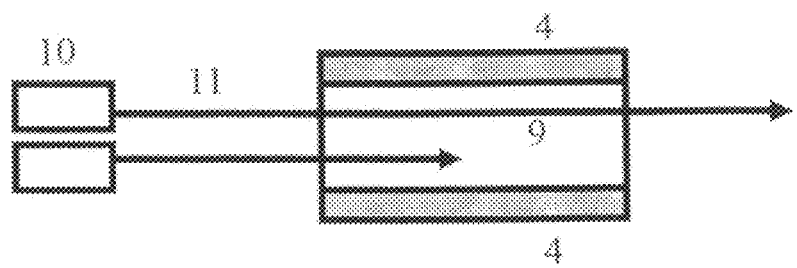
FIG. 18 is an illustration of a light filter constituted of a cell containing a microphase-separated structure solution and equipped with a heating unit.
Figure 19:
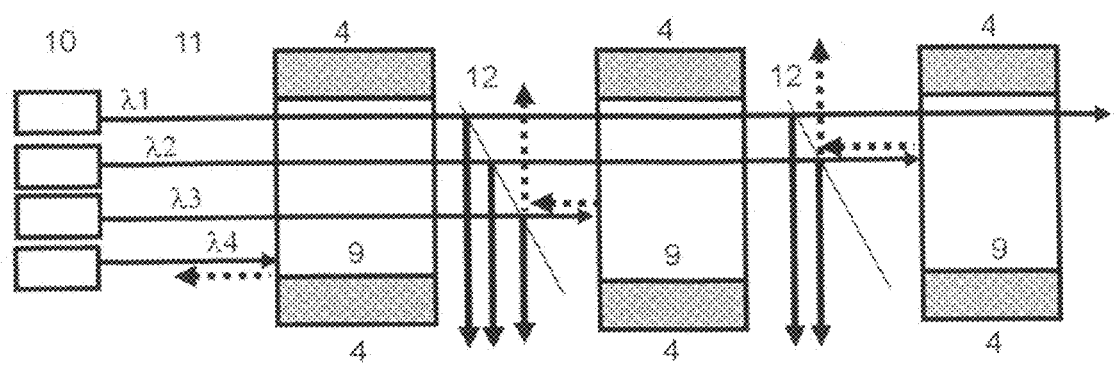
FIG. 19 is an illustration of a light filter for multiwavelength selection constituted of a cell containing a microphase-separated structure solution and equipped with a heating/cooling unit.

1 Microphase-separated structure containing a laser dye
2 Excitation light source 3 Excitation light
4 Heating/cooling element
5 Object whose temperature is to be detected
6 Laser light
7 Optical fiber
8 Spectroscopic detector
9 Cell containing a microphase-separated structure
10 Monochromatic light source
11 Monochromatic light
12 Light beam dispersion unit

The invention claimed is:

1. An immobilized microphase-separated structure formed by adding a photopolymerization initiator to a microphase-separated structure comprising a block copolymer, which contains at least a block chain A consisting of a monomer A as a repeating unit and a block chain B consisting of a monomer B as a repeating unit, and a solvent, wherein the solvent has a temperature zone 1 where the block chain A and the block chain B are soluble and a temperature zone 2 where the block chain A is insoluble but the block chain B is soluble, and the structural period thereof varies changing temperature between the temperature zone 1 and the temperature zone 2 and irradiating actinic rays thereto, wherein the amount of block copolymer is 1.0 to 15% by mass relative to the total amount of solvent and the weight average molecular weight of the block copolymer is $5.0 \times 10^5$ to $20 \times 10^5$ g/mol.

2. The immobilized microphase-separated structure according to claim 1, wherein the microphase-separated structure before irradiation with the actinic rays is a visible-size grain.

3. The immobilized microphase-separated structure according to claim 1, wherein one of the block chain A and the block chain B of the block copolymer has a double bond of diene.

4. The immobilized microphase-separated structure according to claim 2, wherein one of the block chain A and the block chain B of the block copolymer has a double bond of diene.

5. A wavelength-variable laser oscillator comprising a laser resonator containing the microphase-separated structure according to claim 1 and containing a laser medium, a heating/cooling element and an excitation source, wherein temperature of the heating/cooling element can be arbitrarily controlled temporally or spatially by an exterior power source or signal source, and the excitation source is an excitation light source which optically excites the laser medium to cause oscillation, or a driving power source which electronically excites the laser medium to cause oscillation.

6. A temperature sensor capable of measuring peripheral temperature of the microphase-separated structure according to claim 1, comprising a laser resonator using the microphase-separated structure according to claim 1 and containing a laser medium, an excitation source and a spectroscopic measurement unit, wherein the excitation source is an excitation light source which optically excites the laser medium to cause oscillation or a driving power source which electronically excites the laser medium to cause oscillation, and the spectroscopic measurement unit optically guides generated laser light to a site at which the laser light is required and the wavelength thereof is spectroscopically analyzed.

7. A light filter comprising a transparent cell equipped with a heating/cooling element and containing the microphase-separated structure according to claim 1, a monochromatic light source, a spectroscopic detector and an analyzer, wherein the heating/cooling element can be arbitrarily controlled temporally or spatially by an exterior power source or signal source; the monochromatic light source is constituted of at least two types of monochromatic light beams; the spectroscopic detector can separately detect the wavelengths of light beams passed through the cell; and the analyzer outputs a signal from the spectroscopic measurement unit as an exterior signal.

* * * * *